(12) United States Patent
Chatroux et al.

(10) Patent No.: US 9,085,243 B2
(45) Date of Patent: Jul. 21, 2015

(54) CHARGE EQUALIZATION SYSTEM FOR BATTERIES

(75) Inventors: Daniel Chatroux, Teche (FR); Julien Dauchy, Chatte (FR); Eric Fernandez, Saint Paul de Varces (FR); Sylvain Mercier, Saint Egreve (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 516 days.

(21) Appl. No.: 13/577,186

(22) PCT Filed: Feb. 4, 2011

(86) PCT No.: PCT/EP2011/051688
§ 371 (c)(1),
(2), (4) Date: Oct. 18, 2012

(87) PCT Pub. No.: WO2011/095608
PCT Pub. Date: Aug. 11, 2011

(65) Prior Publication Data
US 2013/0038290 A1    Feb. 14, 2013

(30) Foreign Application Priority Data

Feb. 5, 2010   (FR) ..................................... 10 00478

(51) Int. Cl.
*H02J 7/00*     (2006.01)
*H02J 7/14*     (2006.01)
(Continued)

(52) U.S. Cl.
CPC ........... *B60L 11/1866* (2013.01); *B60L 3/0046* (2013.01); *B60L 11/1861* (2013.01); *H02J 7/0013* (2013.01); *H02J 7/0016* (2013.01); *H02J 7/0018* (2013.01); *H02J 7/0019* (2013.01); *H01M 10/0525* (2013.01); *H01M 10/482* (2013.01); *H01M 10/486* (2013.01); *Y02T 10/7005* (2013.01); *Y02T 10/7011* (2013.01); *Y02T 10/7044* (2013.01); *Y02T 10/7055* (2013.01); *Y02T 10/7061* (2013.01)

(58) Field of Classification Search
USPC ......... 320/118, 119, 116, 117, 122, 109, 121, 320/162, 152, 103
See application file for complete search history.

(56) References Cited

U.S. PATENT DOCUMENTS 5,479,083 A   12/1995   Brainard
5,659,237 A    8/1997   Divan et al.
(Continued)

FOREIGN PATENT DOCUMENTS

CN         1905259        1/2007

*Primary Examiner* — Edward Tso
*Assistant Examiner* — Alexis A Boateng
(74) *Attorney, Agent, or Firm* — Occhiuti & Rohlicek LLP

(57) ABSTRACT

An equalization system for batteries has two series-connected accumulator stages connected, each including an accumulator, a voltage generator including positive and negative poles, for each stage, an associated charging device supplied by the voltage generator. The charging device includes an inductor having a first and second ends, and a capacitor having first and second ends. The capacitor's first end connects to the generator's positive pole. It also has a diode whose anode connects to a negative pole of the accumulator stage and whose cathode connects to the inductor's first end. It also has a switch whose first end connects to the inductor. And it also has a control device that controls the generator and closes a switch of a charging device associated with an accumulator stage to be charged so that the inductor stores energy, and causes its transfer to that accumulator stage.

15 Claims, 17 Drawing Sheets

(51) Int. Cl.
*B60L 11/18* (2006.01)
*B60L 3/00* (2006.01)
H01M 10/0525 (2010.01)
H01M 10/48 (2006.01)

(56) References Cited

U.S. PATENT DOCUMENTS

| | | | |
|---|---|---|---|
| 5,710,504 A | 1/1998 | Pascual et al. | |
| 6,140,800 A | 10/2000 | Peterson | |
| 6,362,597 B2 * | 3/2002 | Leppo et al. | 320/116 |
| 6,583,602 B2 * | 6/2003 | Imai et al. | 320/118 |
| 8,049,349 B2 * | 11/2011 | Saito et al. | 290/40 A |
| 2002/0109482 A1 * | 8/2002 | Anzawa et al. | 320/119 |
| 2004/0032236 A1 * | 2/2004 | Canter | 320/137 |
| 2005/0140335 A1 * | 6/2005 | Lee et al. | 320/118 |
| 2008/0084184 A1 | 4/2008 | Ohnuki | |
| 2008/0116850 A1 | 5/2008 | Konishi et al. | |
| 2009/0067200 A1 * | 3/2009 | Bolz et al. | 363/17 |
| 2009/0195079 A1 | 8/2009 | Barrenscheen | |
| 2010/0007308 A1 | 1/2010 | Lee et al. | |
| 2012/0292988 A1 * | 11/2012 | Nishida et al. | 307/10.1 |

* cited by examiner

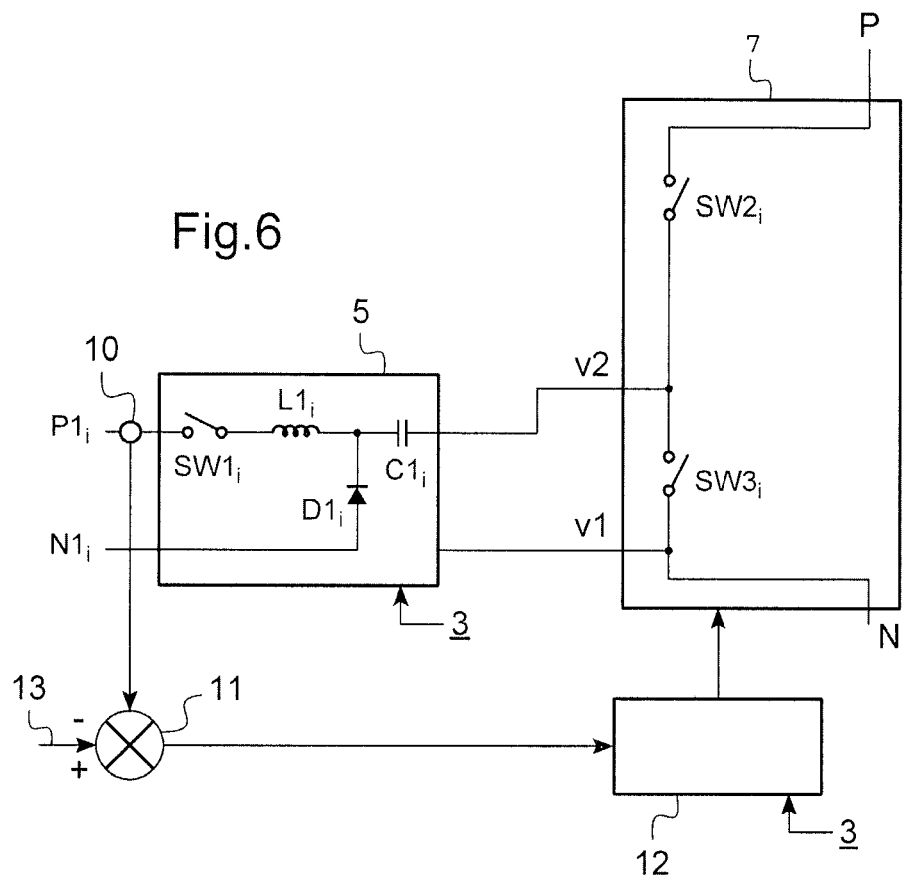
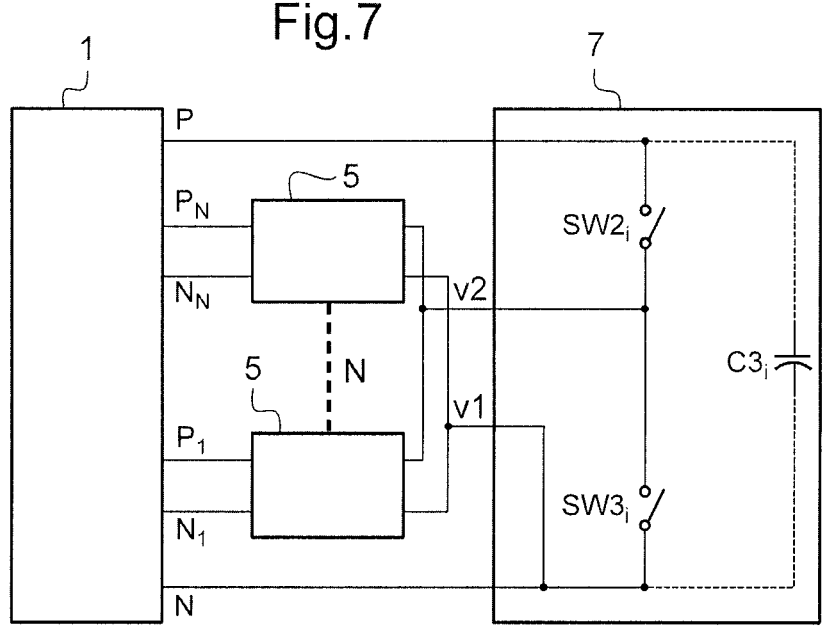

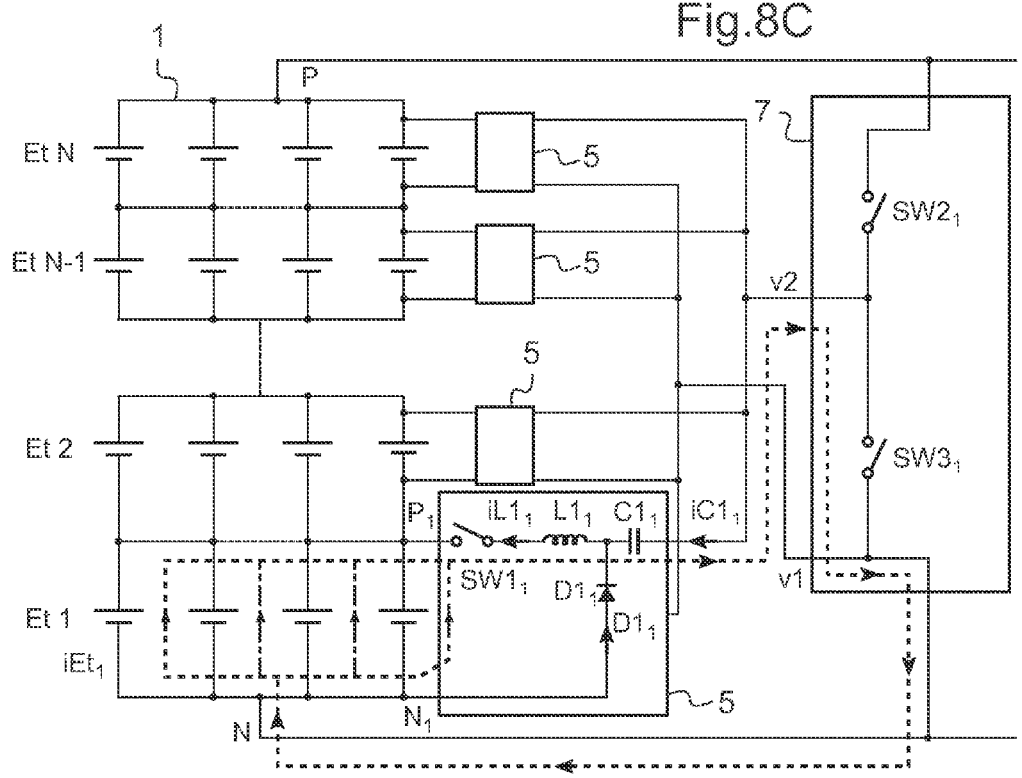
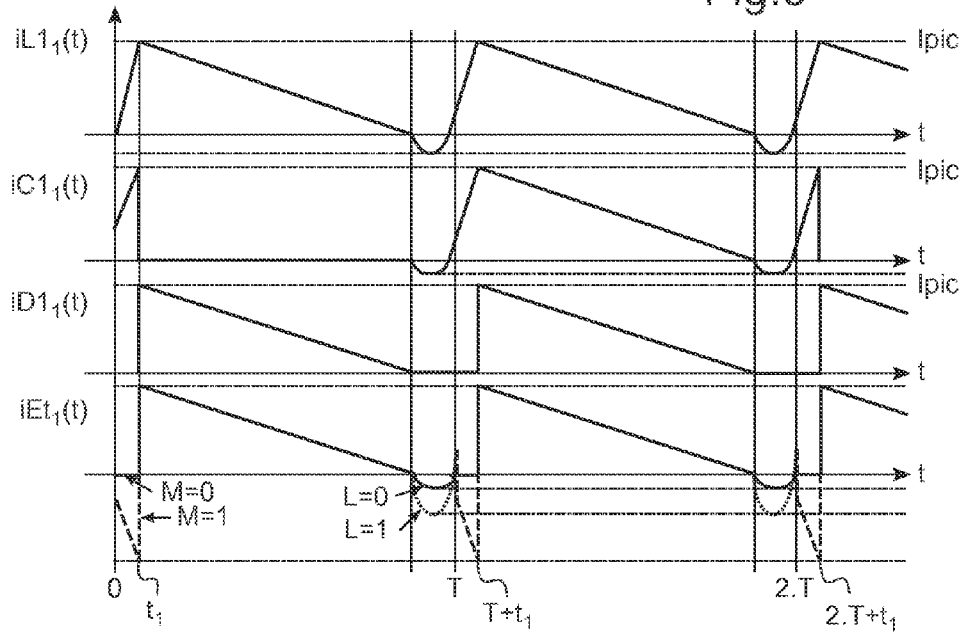

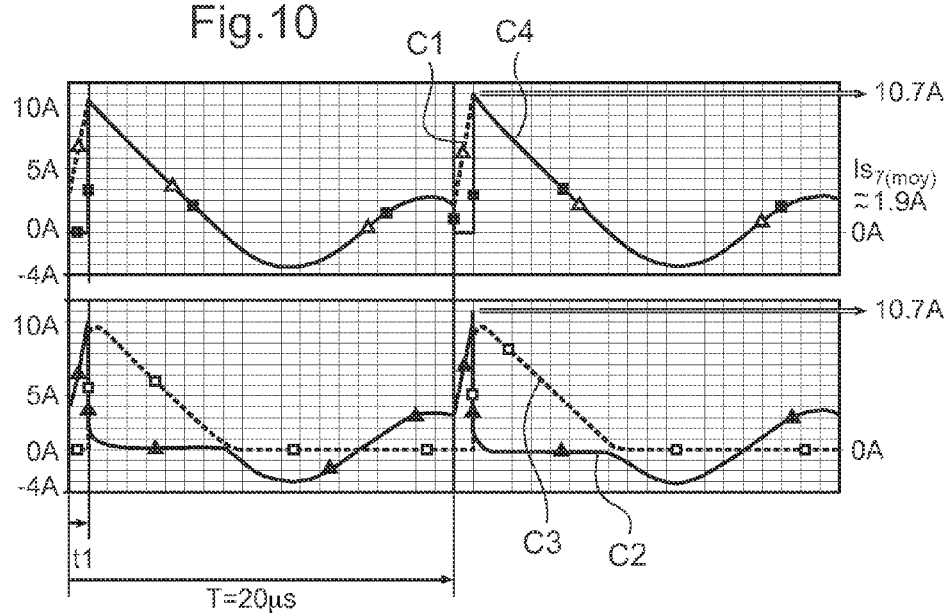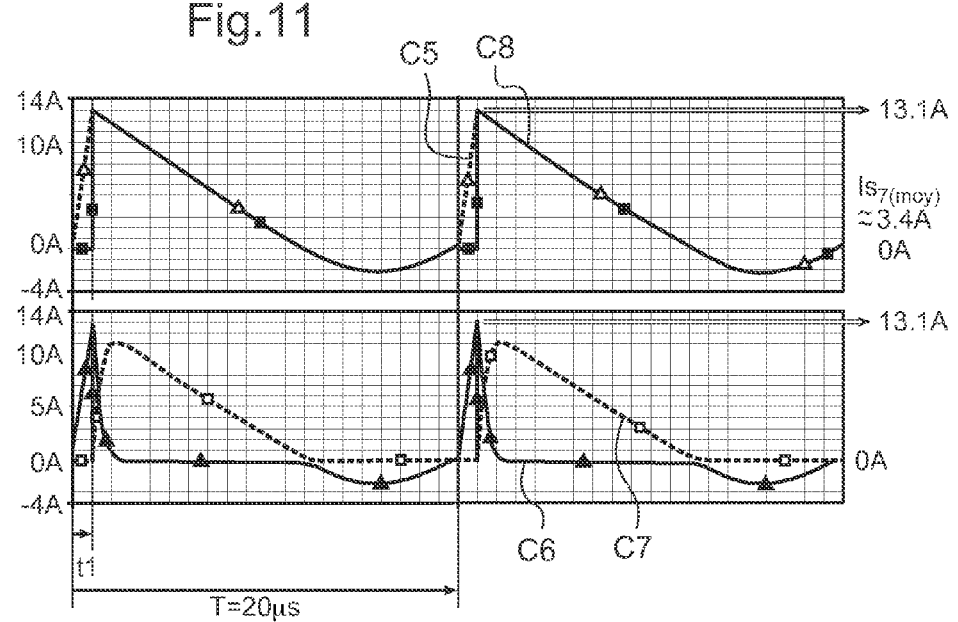

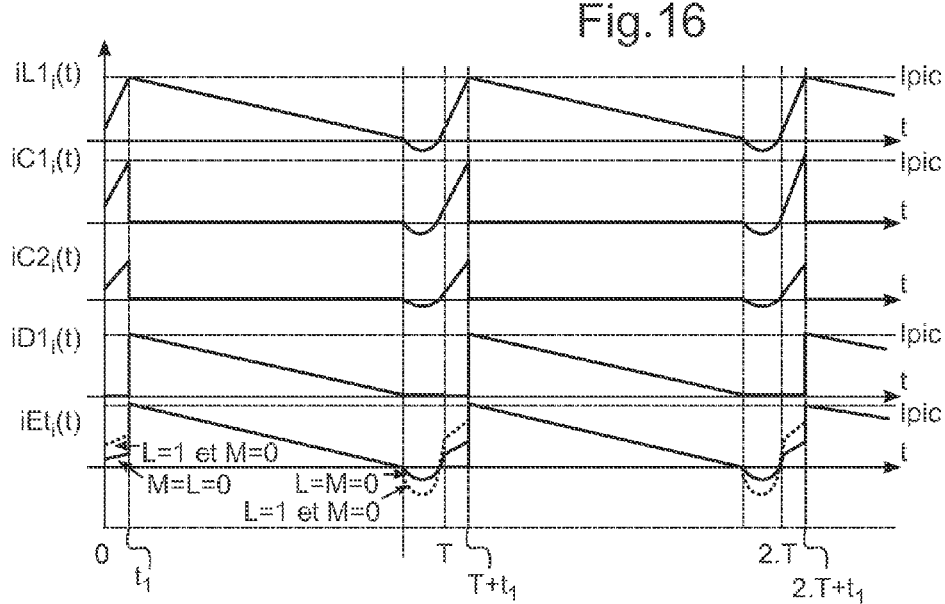
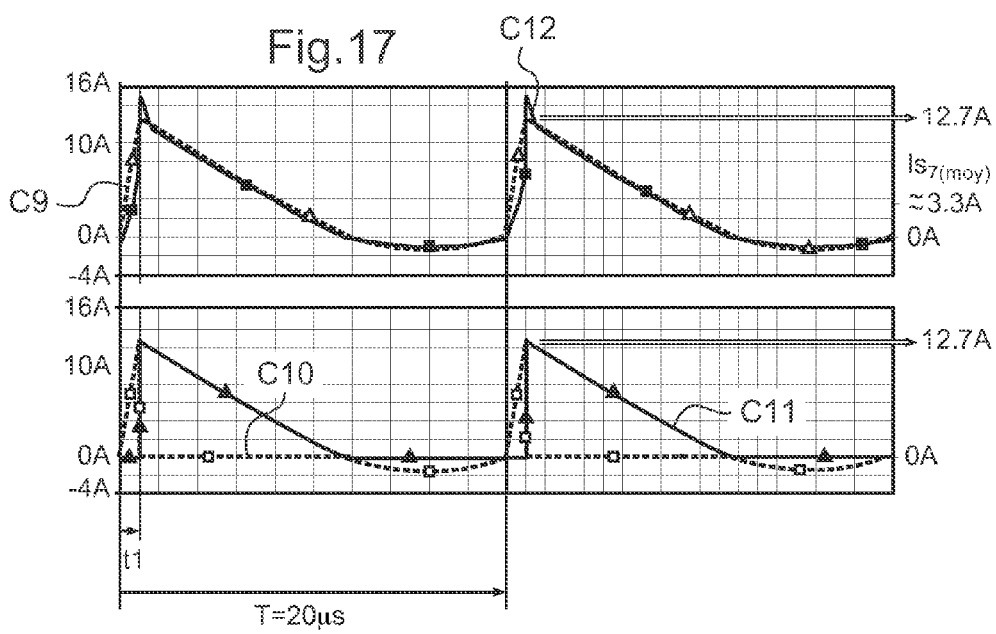
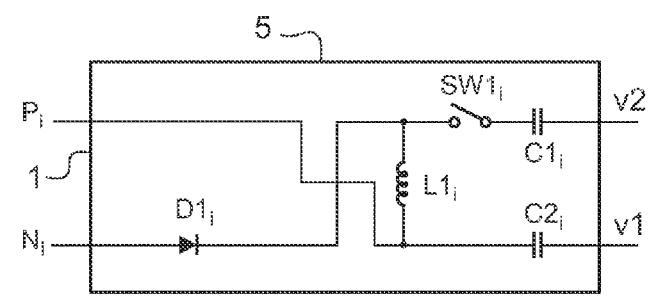

CHARGE EQUALIZATION SYSTEM FOR BATTERIES

CROSS-REFERENCE TO RELATED APPLICATIONS

This application is the National Stage of International Application No. PCT/EP2011/051688, filed on Feb. 4, 2011, which claims the benefit of the priority date of French Application No. 1000478, filed on Feb. 5, 2010. The content of these applications is hereby incorporated by reference in its entirety.

FIELD OF DISCLOSURE

The invention concerns a charge equalization system for electrochemical accumulator batteries, usable notably in the field of electric or hybrid transport and onboard systems. The invention concerns in particular batteries of lithium-ion (Li-ion) type suitable for this kind of application because of their ability to store large amounts energy with a low mass. The invention is equally applicable to supercapacitors.

BACKGROUND

An electrochemical accumulator has a nominal voltage of the order of a few volts, to be more precise 3.3 V for Li-ion batteries based of iron phosphate and 4.2 V for a Li-ion technology based on cobalt oxide. If this voltage is too low relative to the requirements of the systems to be supplied with power, a plurality of accumulators are connected in series. It is equally possible to dispose one or more accumulators in parallel with each series-connected accumulator in order to increase the available capacity and to provide a higher current and a higher power. The parallel-connected accumulators then form what is referred to herein as a stage. A stage is constituted of at the minimum one accumulator. The stages are connected in series to reach the required voltage level. The association of accumulators is called an accumulator battery.

Charging and discharging an accumulator is reflected in an increase or a decrease, respectively, in the voltage at its terminals. An accumulator is considered charged or discharged when it reaches a voltage level defined by the electrochemical process. In a circuit utilizing a plurality of accumulator stages, the current in the stages is the same. The level of charge or discharge of the stages thus depends on the intrinsic characteristics of the accumulators, namely the intrinsic capacitance and the series and parallel parasitic internal resistances of the electrolyte or of contact between the electrodes and the electrolyte. Voltage differences between the stages are then possible because of fabrication disparities and ageing.

For a Li-ion technology accumulator, too high or too low a voltage, called the threshold voltage, may damage or destroy the accumulator. For example, overcharging a Li-ion accumulator based on cobalt oxide may lead to thermal runaway and start a fire. For a Li-ion accumulator based on iron phosphate, overcharging is reflected in decomposition of the electrolyte that decreases its service life or can damage the accumulator. Too great a discharge, for example leading to a voltage less than 2 V, leads primarily to oxidation of the current collector of the negative electrode if it is made of copper and thus to damage to the accumulator. Consequently, surveillance of the voltages at the terminals of each accumulator stage is obligatory during charging and discharging for reasons of safety and reliability. A so-called surveillance device in parallel with each stage enables this function to be provided.

The surveillance device has the function of tracking the state of charge and discharge of each accumulator stage and transmitting the information to the control circuit in order to stop charging or discharging the battery if a stage has reached its threshold voltage. However, in the case of a battery with a plurality of accumulator stages disposed in series, if charging is stopped when the stage with the highest charge reaches its threshold voltage, the other stages may not be fully charged. Conversely, if discharge is stopped when the most discharged stage reaches its threshold voltage, the other stages may not be totally discharged. The charge in each accumulator stage is thus not used optimally, which represents a major problem in transport and onboard type applications having severe autonomy constraints. To alleviate this problem, the surveillance device is generally associated with an equalization device.

The equalization device has the function of optimizing the charge of the battery and therefore its autonomy by bringing the accumulator stages connected in series to an identical state of charge and/or discharge. There exist two categories of equalization devices, so-called energy dissipation equalization devices and so-called energy transfer equalization devices.

In the case of energy dissipation equalization devices, the voltage at the terminals of the stages is rendered uniform by bypassing the charging current of one or more stages when the threshold voltage has been reached and dissipating the energy in a resistor. Alternatively, the voltage at the terminals of the stages is rendered uniform by discharging one or more stages where the threshold voltage has been reached. However, such energy dissipation equalization devices have the major drawback of consuming more energy than is necessary to charge the battery. This circuit makes it obligatory to discharge a plurality of accumulators or to divert the charging current of a plurality of accumulators so that the last accumulator or accumulators with a slightly lower charge finish(es) charging. The energy dissipated can therefore be very much greater than the charge or charges to be completed. Moreover, the excess energy is dissipated as heat, which is not compatible with integration constraints in transport and onboard type applications, and the service life of the accumulators falls sharply if the temperature is raised.

Energy transfer equalization devices exchange energy between the accumulator battery or an auxiliary power network and the accumulator stages.

There is known from the U.S. Pat. No. 5,659,237, for example, a device enabling transfer of energy from the auxiliary network to the stages by a "flyback" structure with a plurality of outputs using a coupled inductor as a storage element. The latter element is a specialized component because it is dedicated to this application. The cost of such a component is prohibitive for the function to be implemented.

There is known from the patent CN1905259 a device enabling transfer of energy from the stages to the battery and that for its part uses an inductor for each accumulator as a storage element. However, this device does not opt for optimized energy transfer for equalization of the batteries in transport and onboard type applications. The end of charging of a battery is indeed determined by the last stage to reach the threshold voltage. To terminate the charging of the battery, energy is taken from one or more stages and returned to the group of stages. If one or more accumulator stage(s) is or are slightly less charged, energy is then not transferred with priority to the latter stage(s) that require(s) it but also to the stage(s) from which the energy is taken. Equalization thus necessitates taking energy from all stages at the end of charging in order to prevent charging them to too high a voltage.

Equalization is thus effected with high losses because of the large number of converters operating. Moreover, accumulators for which charging has already ended have alternating or direct current components of no utility pass through them.

An object of the invention is therefore to propose an improved equalization device that does not have these drawbacks of the prior art.

SUMMARY

To this end, the invention provides an equalization system for batteries comprising at least two accumulator stages connected in series, each accumulator stage comprising at least one accumulator, characterized in that said system includes:
- at least one voltage generator comprising at least one positive pole and at least one negative pole,
- for each accumulator stage an associated charging device fed by said at least one voltage generator and comprising:
  - at least one inductor,
  - at least one capacitor the first end of which is connected to said positive pole of said at least one voltage generator,
  - at least one diode connected by its anode to the negative pole of said accumulator stage and by its cathode to the first end of said at least one inductor, and
  - at least one switch one end of which is connected to one end of said at least one inductor, and
- a control device configured to control said at least one voltage generator and to close said at least one switch of a charging device associated with a accumulator stage to be charged, so that said at least one inductor stores energy, and to transfer that energy to said associated accumulator stage.

Said equalization system may further include one or more of the following features, separately or in combination:
- the second end of said at least one capacitor is connected to the first end of the inductor, the cathode of said at least one diode is connected to the second end of the capacitor, and said at least one switch is connected by its first end to the second end of the inductor and by its second end to the positive pole of the associated accumulator stage;
- said charging device includes at least one first capacitor the first end of which is connected to said positive pole of the voltage generator and the second end of which is connected to the first end of the inductor, at least one second capacitor the first end of which is connected to said negative pole of said voltage generator and the second end of which is connected to the negative pole of the associated accumulator stage, said at least one diode is connected by its anode and its cathode to the second end of said second capacitor and to the second end of said first capacitor, respectively, and said at least one switch is connected by its first end to the second end of the inductor and by its second end to the positive pole of the associated accumulator stage;
- said charging device includes at least one first capacitor the first end of which is connected to said positive pole of the voltage generator, at least one second capacitor the first end of which is connected to said negative pole of said voltage generator and the second end of which is connected to the second end of the inductor and to the positive pole of the associated accumulator stage, and said at least one switch is connected by its first end to the second end of the first capacitor and by its second end to the first end of the inductor;
- said charging device includes at least one first inductor and one second inductor, at least one first capacitor the first end of which is connected to said positive pole of a voltage generator and the second end of which is connected to the first end of the first inductor, at least one second capacitor the first end of which is connected to said negative pole of said voltage generator and the second end of which is connected to the first end of the second inductor, at least one first diode the anode and the cathode of which are connected to the negative pole of the associated accumulator stage and to the first end of the first inductor, respectively, at least one second diode the anode and the cathode of which are connected to the negative pole of the associated accumulator stage and to the first end of the second inductor, respectively, and said at least one switch is connected by its first end to the second ends of said inductors and by its second end to the positive pole of the associated accumulator stage;
- the control device is configured to control the rate of closing of said at least one switch of a charging device associated with a accumulator stage to be charged when a voltage is applied beforehand to the poles of said voltage generator feeding said charging device;
- said charging device is configured to operate in discontinuous conduction mode independently of the voltages of the associated accumulator stage and the battery during the charging phase;
- said equalization system includes single voltage generator for feeding all of said charging devices;
- said battery equalization system includes a voltage generator for each charging device;
- said battery equalization system includes at least two voltage generator devices associated with a respective predetermined number of charging devices;
- said at least one voltage generator includes at least one switch controlled by the control device;
- said at least one voltage generator includes a decoupling capacitor;
- said at least one voltage generator includes two controlled switches and two inductors;
- said at least one voltage generator includes a switch and a transformer;
- said at least one voltage generator includes a bridge including four switches and a transformer;
- said at least one voltage generator includes two switches, a transformer and two capacitors;
- said at least one voltage generator includes two switches and a transformer with a center-tapped primary;
- the control device is configured to close and to open said at least one controlled switch of said at least one voltage generator device with a conduction period and an opening time, respectively, that are constant during a charging phase;
- the conduction period is calculated so that said charging device operates in discontinuous conduction mode;
- said at least one voltage generator is connected to the terminals of the battery;
- said battery includes at least one elementary module, each elementary module comprising a plurality of accumulator stages in series, and said equalization system further includes a supplementary charging device at the terminals of each elementary module;
- said battery includes a plurality of elementary modules disposed in series and said equalization system includes a supplementary charging device at the terminals of a predetermined number of elementary modules;

said at least one voltage generator is connected to the terminals of said at least one elementary module;

said battery equalization system includes a device for measuring the voltage of each accumulator stage, configured to transmit voltage information to the control device;

the accumulators are of lithium-ion type;

the battery includes supercapacitors.

The invention also provides a charging device for a charge equalization system as defined above.

BRIEF DESCRIPTION OF THE FIGURES

Other features and advantages of the invention will become more clearly apparent on reading the following description, given by way of illustrative and nonlimiting example, and from the appended drawings, in which:

FIG. 6 is a block diagram of one exemplary embodiment of a voltage generator associated with the charging device from FIG. 5 in continuous conduction mode, FIG. 7 is a block diagram of one exemplary embodiment of a voltage generator associated with the charging device from FIG. 5 in discontinuous conduction mode, FIG. 8c is a block diagram of the equalization system including the charging device from FIG. 5 and the voltage generator from FIG. 6, in which there has been indicated the flow of the current once the diode of the charging device is blocked, FIG. 9 is a diagram representing the evolution as a function of time of the various currents in the charging device from FIG. 5 and in the parallel accumulator stage, FIG. 10 shows diagrammatically curves of evolution of the various currents in the charging device from FIG. 5 and in the associated accumulator stage for a first simulation, FIG. 11 shows diagrammatically curves of evolution of the various currents in the charging device from FIG. 5 and in the associated accumulator stage for a second simulation, FIG. 16 is a diagram representing the evolution as a function of time of the various currents in the charging device from FIG. 12 and in the parallel accumulator stage, FIG. 17 shows diagrammatically curves of evolution of the various currents in the charging device from FIG. 12 and in the associated accumulator stage, FIG. 18 is a block diagram of a third embodiment of a charging device of the equalization system.

In these figures, substantially identical elements bear the same references.

DETAILED DESCRIPTION

Figure 1:
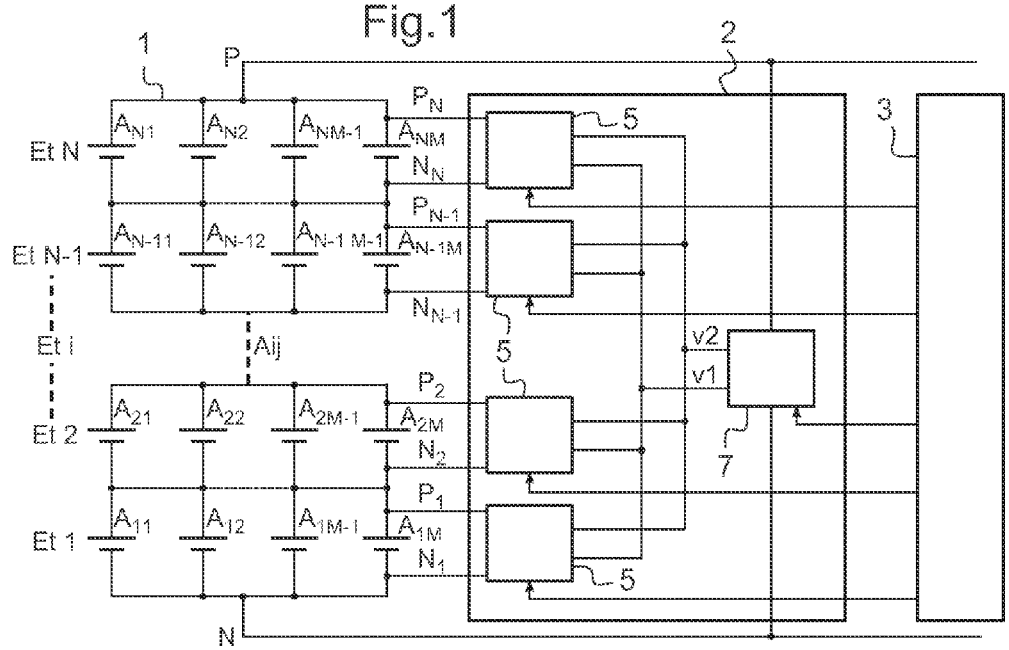
FIG. 1 is a block diagram of a battery including accumulator stages connected in series and a battery charge equalization system including a charging device for each accumulator stage and a voltage generator.

FIG. 1 shows an accumulator battery 1. This battery 1 is composed of N stages $Et_i$ connected in series. Each stage $Et_i$ is composed of one accumulator or a plurality of accumulators $A_{ij}$, connected in parallel. Here the suffix i represents the stage number, and this suffix i varies in the example shown in FIG. 1 from 1 to N, and the suffix j represents the number of each accumulator in a given stage, and in the example shown this suffix j varies from 1 to M. The terminals of the accumulators $A_{ij}$ of the same stage $Et_i$ are connected together by means of electrical connections, just as each stage $Et_i$ is also connected to the adjacent stages $Et_i$ by means of electrical connections.

The subject of the invention is a charge equalization system 2 for a accumulator battery 1 of this kind including at least two stages $Et_i$ connected in series.

The equalization system 2 further includes a control device 3, a plurality of identical charging devices 5 for each accumulator stage $Et_i$, and at least one voltage generator 7 as shown in FIG. 1. The charging devices 5 and the voltage generator(s) 7 are controlled by the control device 3.

The equalization system 2 may further include a voltage measuring device (not shown) for measuring the voltage of each stage $Et_i$ and for transferring voltage information to the control device 3, which is able on the basis of this voltage information to determine if a accumulator stage $Et_i$ must be charged and to control accordingly the charging device 5 in parallel with the accumulator stage and the associated voltage generator 7.

Each accumulator stage $Et_i$ is associated with one of the charging devices 5 and with a single voltage generator 7, for example.

The charging devices 5 are connected on the one hand to the negative pole $N_i$ and to the positive pole $P_i$ of each accumulator stage $Et_i$ and on the other hand to the positive pole, denoted v2, and to the negative pole, denoted v1, of one or more voltage generators 7.

In the case of a single voltage generator 7 (FIG. 1), the latter is connected to the group of charging devices 5.

Figure 2:
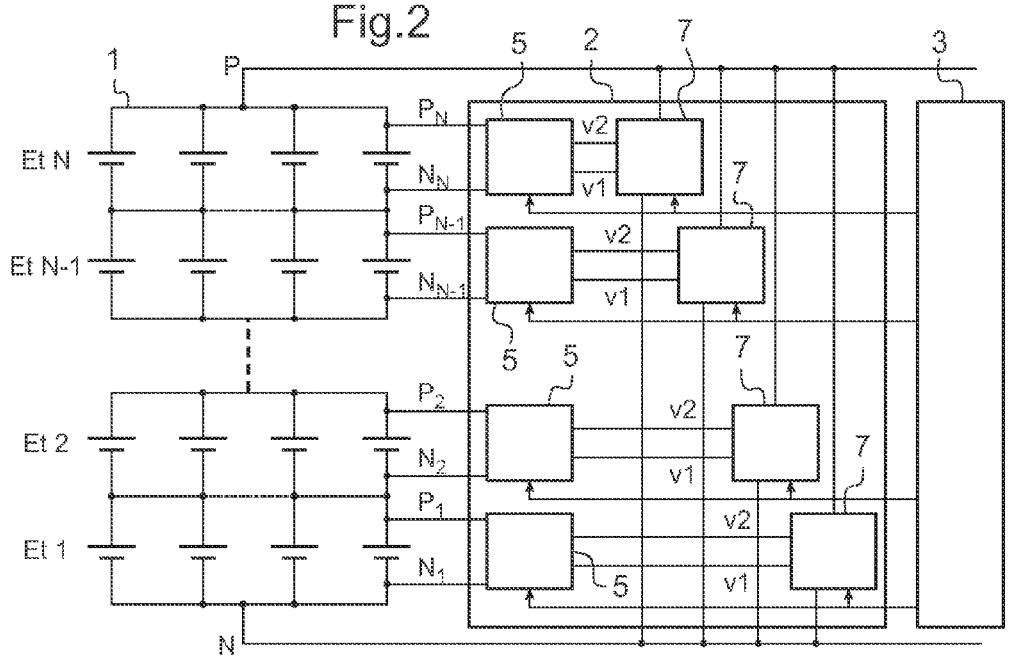
FIG. 2 is a block diagram of a variant of the equalization system from FIG. 1 including a voltage generator for each charging device.

In the case of multiple voltage generators 7, a voltage generator 7 is connected to a charging device 5 if the number of voltage generators 7 is equal to the number of stages $Et_i$, as shown by way of example in FIG. 2.

Figure 3:
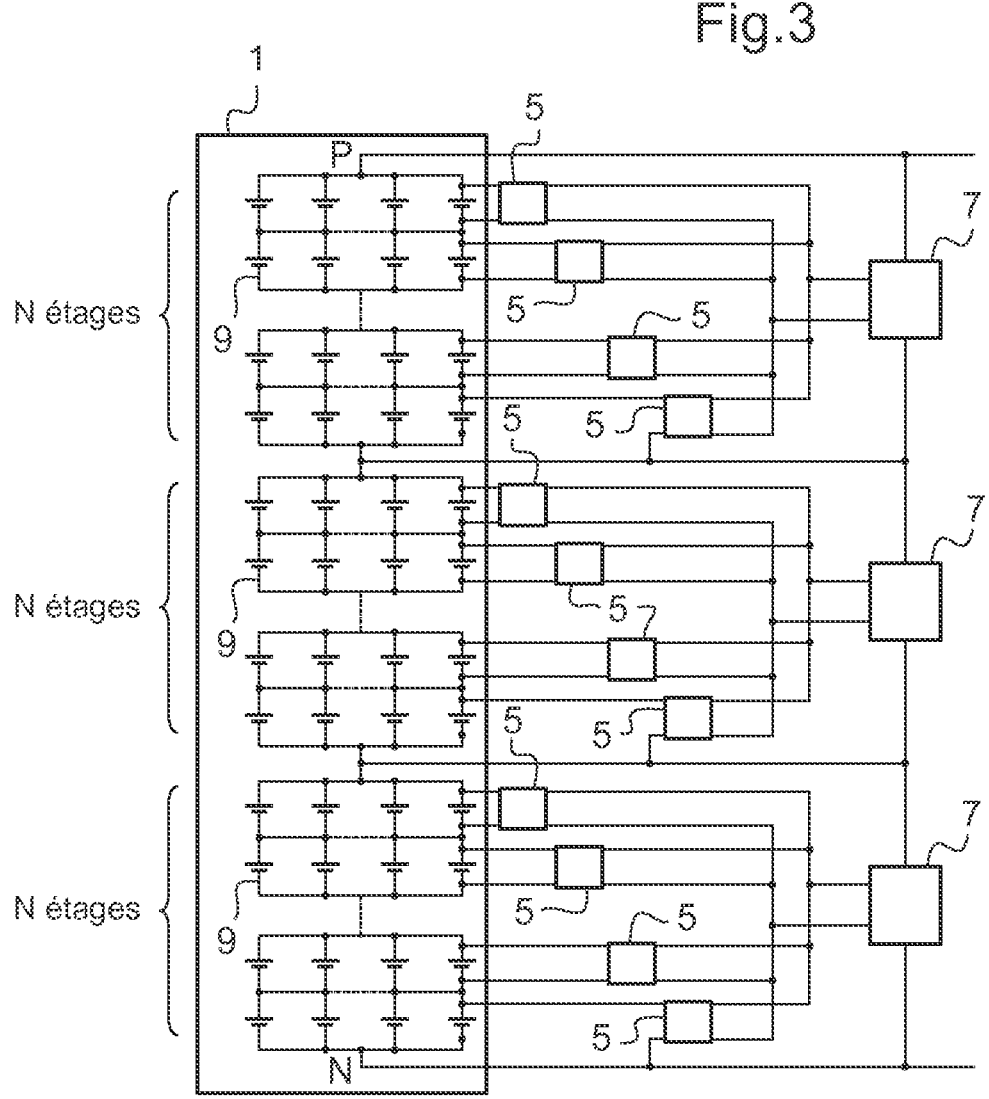
FIG. 3 is a block diagram of another variant of the equalization system from FIG. 1 including a voltage generator for each elementary module including a predetermined number of accumulator stages connected in series.

In an alternative shown in FIG. 3, a voltage generator 7 may be connected to a plurality of charging devices 5 if the number of voltage generators 7 is less than the number of stages $Et_i$.

For example, if a large number of accumulator stages $Et_i$ in series is used, as is the case for electric vehicles with one hundred accumulators in series, for example, the battery 1 may be constituted by the series connection of elementary modules 9 (FIG. 3), each including for example ten to twelve accumulator stages $Et_i$ connected in series. Thus the voltage generator(s) 7 is (are) connected to the terminals of ten to twelve elements. The withstand voltage of the diodes and the controlled switches is limited, as a function of the Li-ion battery technology, to approximately 45 V-60 V, which is a standardized withstand voltage value in the semiconductor field. Maintenance of a large number of elementary modules 9, as is the case for electric vehicles, is facilitated.

Figure 4:
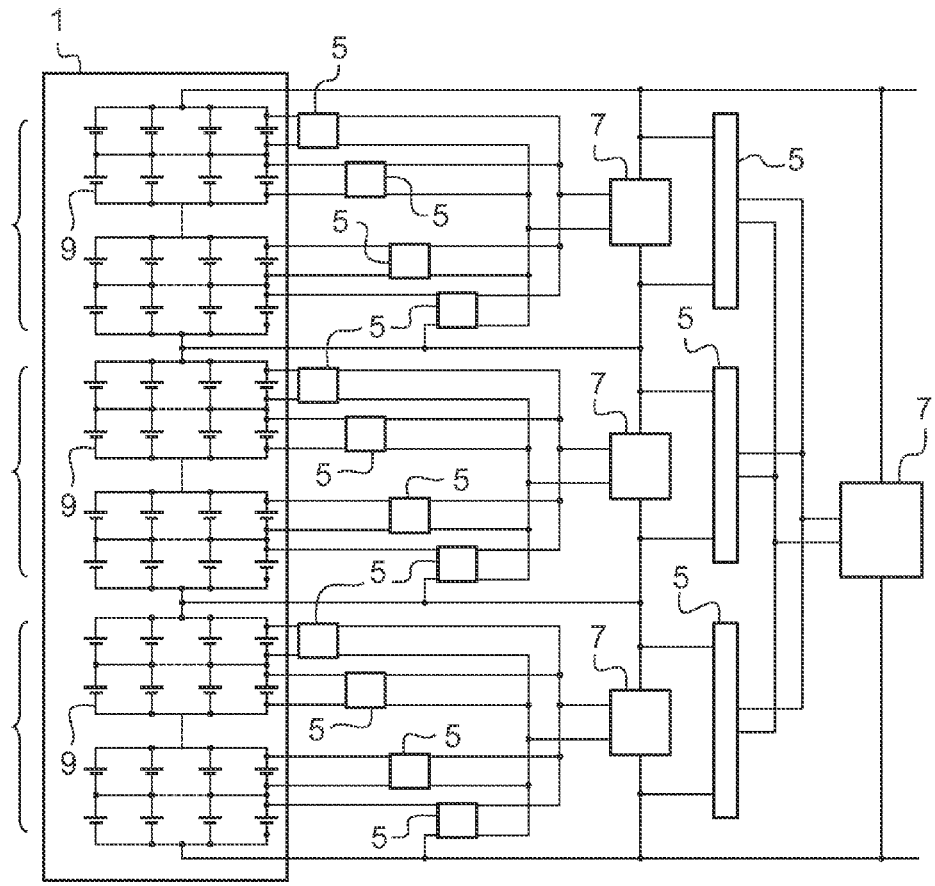
FIG. 4 is a block diagram of another variant of the equalization system from FIG. 3 including a supplementary charging device for each elementary module.

Moreover, in addition to the charging devices 5 for the accumulator stages $Et_i$, identical charging devices 5 may be used by connecting N stages in series as shown in FIG. 4. This variant enables transfer of energy between the N adjacent stages and thus between the associated elementary modules 9 in series. In this case, one or more supplementary voltage generators 7 supply energy to the charging devices 5 connected to the terminals of N stages.

The voltage generator(s) 7 supplies (supply) the charging devices 5 with voltage pulses of positive, negative or positive and negative polarity and of varied shape, for example square-wave or sinusoidal.

First Embodiment

A first embodiment of a charging device 5 and a voltage generator 7 of the equalization system 2 is described next.

Charging Device

Figure 5:
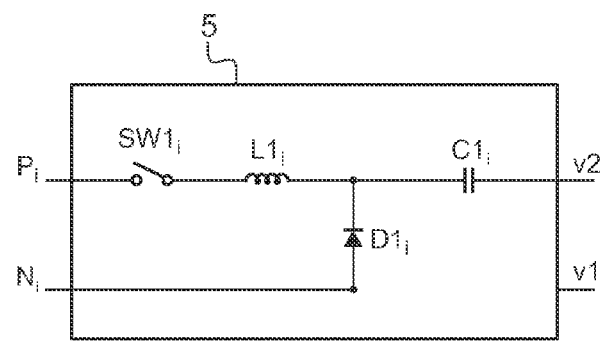
FIG. 5 is a block diagram of a first embodiment of a charging device of the equalization system.

Referring to FIG. 5, in the first embodiment a charging device 5 includes:

an inductor $L1_i$, a capacitor $C1_i$ the first end of which is connected to the pole v2 of a voltage generator 7 and the second end of which is connected to the first end of the inductor $L1_i$, a diode $D1_i$ the anode and the cathode of which are connected to the pole $N_i$ of the stage and to the second end of the capacitor $C1_i$, respectively, a switch $SW1_i$, for example a MOSFET, the first end of which is connected to the second end of the inductor $L1_i$ and the second end of which is connected to the pole $P_i$ of the stage.

The control device 3 enables opening and closing of the switch $SW1_i$.

If the pole v1 of the voltage generator 7 is connected to the negative pole N of the battery 1 (FIGS. 1 to 4), the charging device 5 of this first embodiment has the particular feature of being connected to the pole v1 of the voltage generator 7 via the accumulator stage $Et_i$ to which the charging device 5 is connected and also via the accumulator stages situated below this stage $Et_i$.

A charging device 5 of this kind operates either in continuous conduction mode or in discontinuous conduction mode.

Operation in discontinuous conduction mode is preferred because it has the advantage of being of lower cost and easier to implement.

In discontinuous conduction mode, the current in the inductor $L1_i$ is indeed by definition cancelled before each period T of operation of the charging device 5. The value of the current in the inductor $L1_i$ when the voltage generator 7 is supplying energy can be deduced from the voltage applied to the terminals of the inductor $L1_i$, the time of storage of energy in the inductor $L1_i$ and the value of the latter. After this, the voltage generator 7 may be controlled by a fixed conduction period command.

On the other hand, in continuous conduction mode (FIG. 6), it would be necessary to use a current sensor 10 associated with a regulation loop 11 and with a current reference variable 13, as well as a device for monitoring the current 12, for example in a switched mode using transistors operating as switches, for each of the accumulator stages in series. In continuous conduction mode, a voltage generator 7 would be necessary for each charging device 5. The voltage generator 7 would then be controlled in a pulse width modulation mode.

In discontinuous conduction, the present invention enables all the charging devices 5 to be connected in parallel to the output of a voltage generator 7 thanks to the blocking of direct current by the capacitors $C1_i$.

In a variant embodiment, a capacitor (not shown) may be added at the output of each charging device 5. This capacitor is connected between the terminal $N_i$ and the first end of the switch $SW1_i$. A capacitor of this kind is configured to filter the ripple on the current coming from the charging device 5. A smoothed direct current is thus supplied to each accumulator stage when the charging device 5 is operating.

The position of the switch $SW1_i$ may also be modified to connect it in series with the capacitor $C1_i$.

Two other positions of the switch $SW1_i$ are possible: the switch $SW1_i$ may be connected either to the output v2 of the voltage generator 7 and to the first end of the capacitor $C1_i$ or to the second end of the capacitor $C1_i$ and to the cathode of the diode $D1_i$.

Another variant embodiment consists in using for each charging device 5 a controlled switch instead of a diode. So-called synchronous rectification is then possible. The efficiency of the charging device 5 may be increased thanks to the reduction in the voltage drop in the on state of the component.

Voltage Generator

The voltage generator 7 may have varied structures. One embodiment suitable for a voltage generator 7 supplying only a positive voltage pulse, for example.

FIG. 6 shows an embodiment of a voltage generator 7 associated with the charging device 5 of the first embodiment.

It includes two switches $SW2_i$ and $SW3_i$, for example MOSFETs, connected to the terminals N and P of the battery 1. A so-called decoupling capacitor $C3_i$ may be connected to the terminals of the two switches $SW2_i$ and $SW3_i$.

The voltage generator 7 may be connected to the terminals of an elementary module 9 but equally to the terminals of the battery 1 or even to the terminals of an auxiliary supply (vehicle 12 V supply, for example).

Operation

The operation of the first embodiment is described hereinafter with reference to FIGS. 8a to 8c and 9.

The charging devices 5 enable the charging of certain stages under charge to be continued. Operation in discontinuous conduction mode is preferred for the reasons described above.

For example, if the control device 3 commands the transfer of energy to a stage $Et_i$, for example the stage $Et_1$, the switch $SW1_1$ of the charging device 5 in parallel with the corresponding stage $Et_i$ is closed by the control device 3.

The voltage generator 7 supplying power to the charging device 5 is also activated by the control device 3.

The stages in series with the stage $Et_1$ are not charged while the switch $SW1_1$ of the parallel-connected charging devices 5 of each stage remains in the open state.

If a charging device 5 begins to operate and the voltage generator 7 was operating beforehand, the speed of closing the switch $SW1_1$ must be controlled in order to prevent too high a current being supplied to the stage.

The switches are considered as perfect when they are in the blocked state and therefore allow no current to flow when they are in this state.

First Variant: Voltage Generator with No Decoupling Capacitor

Consider the voltage generator 7 from FIG. 6 without the decoupling capacitor $C3_i$ at the terminals of the switches $SW3_i$ and $SW2_i$.

Referring to FIGS. 8a to 8c and 9, during a conduction period t1, a positive voltage is applied between the terminals v2 and v1 of the voltage generator 7. The switch $SW2_1$ is closed and the switch $SW3_1$ is open. The voltage generator 7 therefore supplies a positive voltage pulse while the switch $SW2_1$ is closed and the switch $SW3_1$ is open.

Figure 8A:
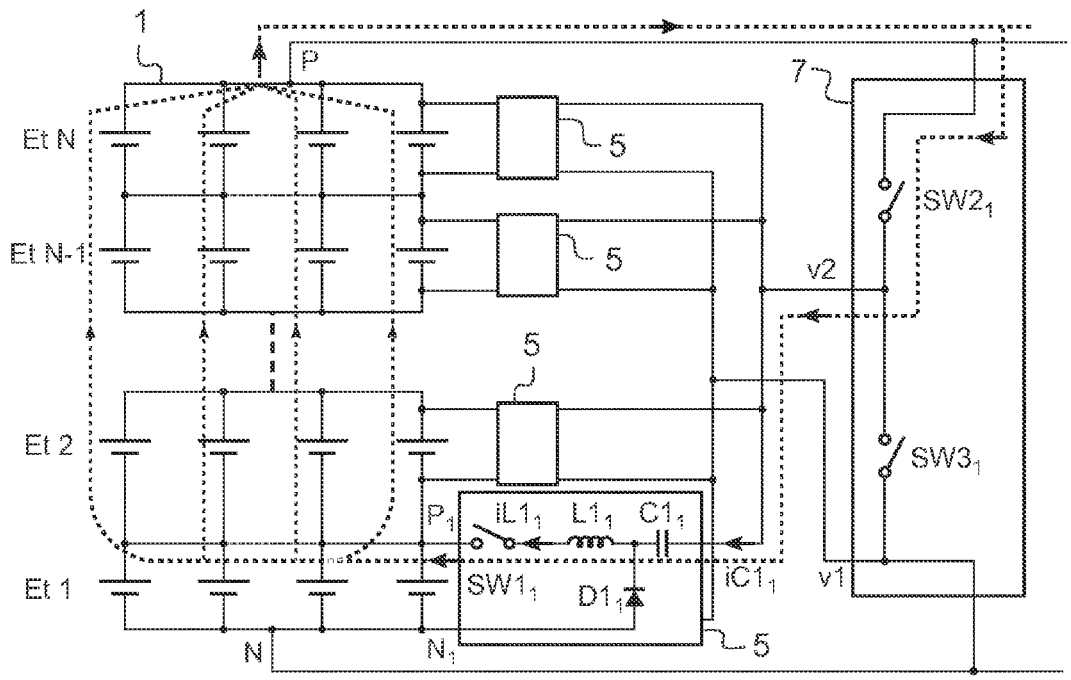
FIG. 8a is a block diagram of the equalization system including the charging device from FIG. 5 and the voltage generator from FIG. 6, in which there has been indicated the flow of the current during a conduction period.
Figure 8B:
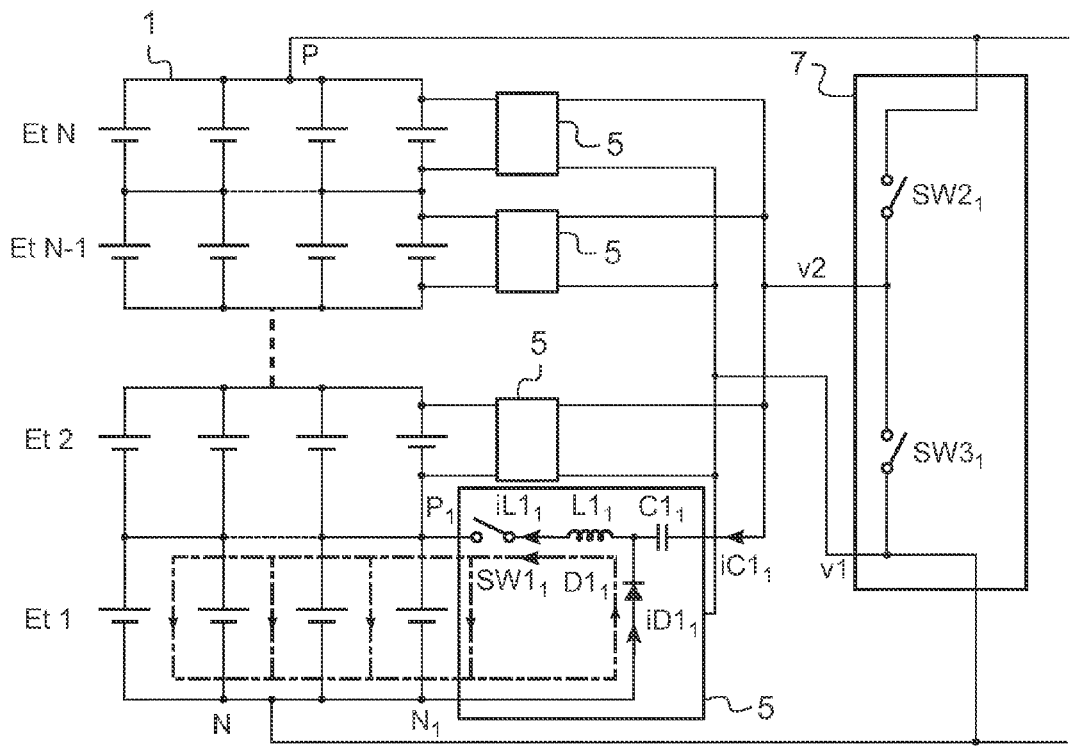
FIG. 8b is a block diagram of the equalization system including the charging device from FIG. 5 and the voltage generator from FIG. 6, in which there has been indicated the flow of the current at the end of the conduction period and until blocking of the diode of the charging device.

The flow of current during the time t1 is shown diagrammatically in FIG. 8a by dotted line arrows.

Energy is stored in the inductor $L1_1$. A capacitor $C1_1$ of sufficiently high value is necessary to transmit sufficient current and to impose a quasi-constant voltage at the terminals of the inductor $L1_1$. The current in the inductor $L1_1$ increases proportionately to the voltage applied to its terminals, approximately equal to the voltage of the battery 1 less the voltage of the stage $Et_1$ under charge. The current flows through the stages situated above the stage $Et_1$. The diode $D1_1$ is blocked during this phase. The voltage at the terminals of the diode $D1_1$ is equal to minus the voltage of the battery 1.

At the end of the time t1, the output voltage of the voltage generator 7 becomes zero. The switch $SW2_1$ of the voltage generator 7 opens. The switch $SW3_1$ closes when the switch $SW2_1$ is fully open.

The current in the inductor $L1_1$ reaches at this time a peak value Ipic (FIG. 9) approximately equal to the voltage applied to the terminals of the inductor when the voltage generator 7 is supplying energy, multiplied by t1 and divided by the value of the inductor. This formula is approximate in that it considers that the current in the inductor is zero before each period of operation of the charging device 5.

The charging device 5 has the particular feature that the current in the inductor $L1_1$ goes negative and thereafter oscillates between negative and positive values when the diode $D1_1$ is blocked, and thus before each period T of operation of the charging device 5. This particular feature is a necessity in that the mean current through the capacitor $C1_1$ must be zero for each period T of operation of the charging device 5 in the permanent regime.

At the end of the time t1 and until the diode $D1_1$ is blocked, the voltage generator 7 imposes a zero voltage at the terminals v2 and v1. The switch $SW3_1$ is closed and the switch $SW2_1$ is open. The flow of the current during this phase is shown diagrammatically in FIG. 8b by chain-dotted line arrows.

The current in the inductor $L1_1$ decreases proportionately to the voltage applied to its terminals, equal to minus the voltage of the accumulator stage $Et_1$ less the voltage drop in the on state of the diode $D1_1$. The diode $D1_1$ is on during this phase until the current in it is cancelled out. The flow of the current once the diode $D1_1$ is blocked is represented diagrammatically in FIG. 8c by dashed-line arrows.

As explained above, the current in the inductor $L1_1$ becomes negative after conduction of the diode $D1_1$ and thereafter oscillates between negative and positive values (FIG. 9). The oscillation frequency of the current during this phase is approximately defined by the inherent resonant frequency of the capacitor $C1_1$ and the inductor $L1_1$. This current flows through the stage $Et_1$ under charge, the stages situated under the stage $Et_1$, the capacitor the inductor $L1_1$ and the switch $SW3_1$.

At the end of the period T, a new sequence of operation commences if the switch $SW1_1$ is still in the closed state. The voltage generator 7 is controlled in such a way that the two switches $SW2_1$ and $SW3_1$ are not on at the same time in order to prevent short-circuiting of the battery. Between the switch $SW3_1$ opening and the switch $SW2_1$ closing, it is imperative that the current in the inductor $L1_1$ is zero or positive to enable continuity of the current in the diode $D1_1$. The inherent resonant frequency of the capacitor $C1_1$ and the inductor $L1_1$ must be taken into consideration when dimensioning the device.

If the current in the inductor $L1_1$ should be negative, it would then be necessary for the switch $SW2_1$ to be bidirectional in terms of current flow, for example by using a diode connected in antiparallel with the switch $SW2_1$.

Second Variant: Voltage Generator with Decoupling Capacitor

In the context of the use of the decoupling capacitor $C3_i$ at the terminals of the switches $SW3_i$ and $SW2_i$ (FIG. 6), the circulation of the current is modified when the switch $SW2_i$ is closed. The capacitor $C3_i$ indeed also supplies part of the current that flows through the inductor $L1_i$. This current is looped by the stage $Et_i$ under charge and by the stages situated under the stage $Et_i$ under charge. The value of the current supplied depends on the position of the stage $Et_i$ under charge relative to the N stages. The nearer the stage $Et_i$ is to the terminal N of the battery, the greater the value of the current supplied by the capacitor $C3_i$ relative to the current that flows through the stages situated above the stage $Et_i$ under charge.

Dimensioning

Equations

The dimensioning of the charging device 5 (FIG. 5) is determined using equations representing its operation as described above. The equations are effective for the associated voltage generator 7 (FIG. 6).

The use of equations as described hereinafter is generalized. To this end, the input and output voltages are respectively denoted Ve and Vs. The voltage Ve is the voltage between the terminals N and P of the battery 1. The voltage Vs is the voltage between the terminals $N_i$ and $P_i$ of an accumulator stage $Et_i$.

To simplify dimensioning, the voltage at the terminals of the capacitor $C1_i$, if present, is considered constant over a period T of operation of the charging device 5.

During the time t1, the current ($iL1_i$) in the inductor $L1_i$ increases. The current is considered zero in each period T of operation. Ignoring the voltage drop in the on state of the switches $SW2_i$ and $SW1_i$ and considering the voltage drop Vd with the diode $D1_i$ in the on state, the current $iL1_i(t)$ is written:

$$iL1_i(t) = \frac{Ve - Vs - Vd}{L1_i} \times t \quad \text{(equation 1)}$$

At the end of the time t1, the switch $SW2_i$ is opened. The current in the inductor reaches the following beak value:

$$iL1_i(t1) = Ipic = \frac{Ve - Vs - Vd}{L1_i} \times t1 \quad \text{(equation 2)}$$

At the end of the time t1 and until the current in the inductor $L1_i$ is cancelled out, the diode $D1_i$ conducts. The current in the inductor $L1_i$, decreases in accordance with the following law.

$$iL1_i(t) = -\frac{Vs + Vd}{L1_i} \times t + Ipic \quad \text{(equation 3)}$$

The value ($t1_{(max)}$) not to be exceeded of the conduction period t1 for the charging device 5 to function in discontinuous conduction mode can be defined from equation 3. The current in the inductor must be zero or positive for each period T of operation. The natural period of oscillation for the capacitor $C1_i$ and the inductor $L1_i$ is taken into account in the definition of equation 4. The time $t1_{(max)}$ depends on two terms A and B. To take the worst case scenario, the term A is to be evaluated for the maximum input voltage Ve and the minimum output voltage Vs. The term B depends on the input and output voltages and on the mean output current ($Is_{i(moy)}$). The term B is constant and can thus be evaluated either for the maximum input voltage and the minimum output voltage and the maximum output mean current or, conversely, for the minimum input voltage and the maximum output voltage and the minimum output mean current.

$$t1_{(max)} = T \times \frac{1}{\frac{1}{A} + B} \quad \text{(equation 4)}$$

$$\text{Where } A = \frac{Vs + Vd}{Ve}$$

$$B = \pi \times \sqrt{\frac{1}{2 \times T} \times \frac{C}{(Vs + Vd) \times Is_{i(moy)}}} \times (Ve - Vs - Vd)$$

The output current of the charging device is equal to the current in the inductor $L1_i$. The mean output current of a charging device 5 is calculated from equation 5. Given that the mean current in the capacitor $C1_i$ is zero in the permanent regime, the mean output current ($Is_{i(moy)}$) is equal to the mean current in the diode $D1_i$. The current $Is_{i(moy)}$ is proportional to the input voltage Ve squared and inversely proportional to the output voltage Vs. To supply the desired mean current regardless of the voltage of the accumulator stage and for a given time t1, the maximum output voltage and the minimum input voltage must be taken into account.

$$Is_{i(moy)} = \quad \text{(equation 5)}$$
$$\frac{1}{2} \times \frac{1}{T} \times \frac{L1_i}{(Vs + Vd)} \times Ipic^2 = \frac{1}{2} \times \frac{1}{T} \times \frac{(Ve - Vs - Vd)^2 \times t1^2}{(Vs + Vd) \times L1_i}$$

The current $iEt_i(t)$ in a charged stage $Et_i$ depends on the number of charging devices 5 operating and their position relative to the stage $Et_i$.

If only the charging device 5 in parallel with the stage $Et_i$ is operating, the current in the stage $Et_i$ is therefore equal to the current in the inductor $L1_i$ between t1 and T and is zero the rest of the time. This variant is represented in solid line in FIG. 9.

Considering the number L of charging devices 5 operating situated above the stage $Et_i$, a supplementary current flows through the stage $Et_i$ when the diode $D1_i$ of the corresponding charging devices is blocked. During this phase, and considering the charging devices to be identical, the current $iEt_i(t)$ is equal to the current in a capacitor $C1_i$ multiplied by the number L of device(s) operating plus one. This variant is represented in dotted line in FIG. 9 for L=1.

Considering the number M of charging devices operating situated under the stage $Et_i$, a supplementary current flows through the stage $Et_i$ during the time t1. During this phase, and considering the charging devices to be identical, the current $iEt_i(t)$ is equal and opposite the current in an inductor $L1_i$ multiplied by the number M of devices operating. This variant is represented in dashed line in FIG. 9 for M=1.

The mean value ($IEt_{(moy)}$) of the current in the charged stage is obtained from equation 6.

$$IEt_{i(moy)} = \frac{1}{2} \times \frac{1}{T} \times Ipic \times \left[ \frac{Ipic \times L1_i}{Vs + Vd} - t1 \times (1 + L + M) \right] \quad \text{(equation 6)}$$

EXAMPLE

For example, each charging device 5 enables tracking of the charging of an accumulator stage $Et_i$ and is connected to the terminals of ten stages. A single voltage generator 7 is considered for supplying all the charging devices. The latter generator is connected to the terminals of a series combination of ten stages.

The dimensioning process is divided into two steps. First, the maximum conduction period t1 of the switch $SW2_i$ of the voltage generator 7 is calculated for operation of the charging device in discontinuous conduction mode. Second, the maximum value of the inductor $L1_i$ for supplying the desired mean current at the output of the charging device is defined.

The following hypotheses apply:

mean output current (minimum, $Is_{i(moy)}$): 1 A typical operating frequency (F): 50 kHz, i.e. T=1/F=20 μs voltage of one accumulator (Li-ion based on iron phosphate):

Minimum voltage: 2.5 V

Maximum voltage: 3.6 V voltage drop (Vd) in on state of diodes: 0.3 V-0.7 V.

The capacitor $C1_i$ is dimensioned to transmit sufficient current and to impose a quasi-constant voltage at the terminals of the inductor $L1_i$ of the charging device 5. Considering a voltage drop of the order of 3 V, for a peak current of the order of 6 A and a time t1 of 2.0 μs, the value of the capacitor is of the order of 2 μF. The value of the capacitor is typically of the order of 1 μF to 10 μF.

The maximum values of the time t1 and the inductance of the inductor $L1_i$ are calculated hereinafter. The time $t1_{(max)}$ is calculated using to calculate the term A the minimum voltage drop of the diode $D1_i$, the maximum input voltage and the minimum output voltage of the charging device and to calculate the term B, the minimum mean output current, the minimum input voltage and the maximum output voltage, and a blocking capacitor value set at 2 μF. The maximum inductance $L1_i$ is calculated using the same conditions as were used to calculate the term B from $t1_{(max)}$. The time $t1_{(max)}$ is used to calculate the inductance of the inductor $L1_i$ to minimize the peak current and the rms (root mean square) current in the inductor, the switches and the diodes. For reasons of robustness, however, lower values may be used. The use of a filter capacitor at the output of the charging device does not modify the process of determining the time $t1_{(max)}$ and the inductance of the inductor $L1_i$.

$$t1_{(max)} = T \times \frac{1}{\frac{1}{A} + B} = \quad \text{(equation 4)}$$

$$T \times \frac{1}{\frac{1}{\frac{Vs+Vd}{Ve} + \pi \times}} $$

$$\sqrt{\frac{1}{2 \times T} \times \frac{C}{(Vs+Vd) \times Is_{i(moy)}}} \times (Ve - Vs - Vd)$$

$$= \frac{1}{50 \times 10^3} \times$$

$$\frac{1}{\frac{1}{\frac{2.5+0.3}{9 \times 3.6+2.5} + \pi \times}}$$

$$\sqrt{\frac{50 \times 10^3}{2} \times \frac{2 \times 10^{-6}}{(3.6+0.7) \times 1}} \times (9 \times 2.5 - 0.7)$$

$t1_{(max)} = 1.0 \ \mu s$ (equation 5)

$$L1_{i(max)} = \frac{1}{2} \times \frac{1}{T} \times \frac{(Ve - Vs - Vd)^2 \times t1^2}{(Vs + Vd) \times Is_{i(moy)}}$$

$$= \frac{1}{2} \times 50 \times 10^3 \times \frac{(2.5 \times 9 - 0.7)^2 \times (1.0 \times 10^{-6})^2}{(3.6 + 0.7) \times 1}$$

$L1_{i(max)} = 2.8 \ \mu H$

Simulations

For this example, two simulation results are illustrated in FIGS. 10 and 11.

First Simulation (FIG. 10):

For the first simulation, the accumulators $A_{ij}$ are charged for the most part to the threshold voltage of 2.5 V and for a single accumulator in stage 7 for example to the voltage of 3.6 V. The charging device 5 is connected in parallel with this accumulator, which has the highest charge voltage, i.e. 3.6 V.

The voltage generator 7 that is simulated is the generator represented in FIG. 6 without the decoupling capacitor $C3_i$.

The first result illustrates the extreme case of operation for which the mean output current must be at least 1 A.

FIG. 10 gives the result of this first simulation and shows the currents in the inductor $L1_7$ in the curve C1, the capacitor $C1_7$ in the curve C2, the diode $D1_7$ in the curve C3, and the accumulator with the highest charge voltage in the curve C4.

As described for the previous operation, the current in the inductor $L1_7$ increases for a time t1. During this time t1, the current does not flow through the accumulator under charge but through the accumulators situated above the latter. The diode $D1_7$ is blocked during this phase.

At the end of the time t1, the value of the current reaches a peak value, which is of the order of 10.7 A in this example. From t1, the current in the inductor decreases and is supplied to the accumulator. The diode $D1_7$ conducts and enables demagnetization of the inductor $L1_7$. The circuit operates in discontinuous conduction mode because the current in the inductor $L1_7$ is cancelled out before each period of operation of the device. The current in the inductor $L1_7$, and thus also through the accumulator to be charged, goes negative when the diode $D1_7$ is blocked, i.e. when the current $iD1_7$ cancels out. This current $iL1_7$ oscillates at a frequency close to the inherent oscillation frequency for the capacitor $C1_7$ and the inductor $L1_7$. This current $iL1_7$ flows through the inductor $L1_7$, the accumulator under charge and the accumulators situated under the stage under charge, the capacitor $C1_7$ and the switch $SW3_1$. The mean current in the capacitor $C1_7$ in the permanent regime is thus zero over an operating period.

The mean output current $Is_{7(moy)}$ is equal to approximately 1.9 A. A minimum mean current of 1 A is complied with whatever the voltage of the charged accumulator and the voltage of the accumulator battery. The current is greater than the desired value mainly because the current in each period T is not equal to 0 as was assumed in dimensioning the parameters of the device. The peak current in the inductor is therefore greater than the value necessary to provide a mean output current of 1 A. The mean current proportional to the peak current in the high inductance squared is therefore seriously impacted (equation 5).

Second Simulation (FIG. 11):

For the second simulation, the accumulators are charged for the most part to the threshold voltage of 3.6 V and for a single accumulator, for example the seventh accumulator, to the voltage of 2.5 V. The charging device 5 is connected in parallel with this accumulator, which has the lowest charge voltage, i.e. 2.5 V. The charging device is therefore connected to the terminals of the seventh stage $Et_7$.

The second result illustrates the extreme case of operation for which the charging device must operate in discontinuous conduction mode and the current in the inductor $L1_i$ must be zero or positive before each period T of operation.

FIG. 11 shows the result of this second simulation and shows the current in the inductor $L1_7$ in the curve C5, the capacitor $C1_7$ in the curve C6, the diode $D1_7$ in the curve C7, and the accumulator that has the lowest charge voltage in the curve C8.

The circuit functions in discontinuous conduction mode because the current in the inductor $L1_i$ is cancelled out before each period T of operation of the device. Discontinuous conduction operation with a positive or zero current in the inductor $L1_i$ is complied with whatever the voltage of the charged accumulator and the voltage of the accumulator battery.

The mean output current $Is_{7(moy)}$ is equal to approximately 3.4 A. It is greater than the minimum value of 1 A. Via the stages situated above and below the stage under charge, the rms current rises to approximately 1.7 A and the mean current is equal to approximately 330 mA.

Second Embodiment

A second embodiment of the equalization system 2 is described next.

Charging Device

Figure 12:
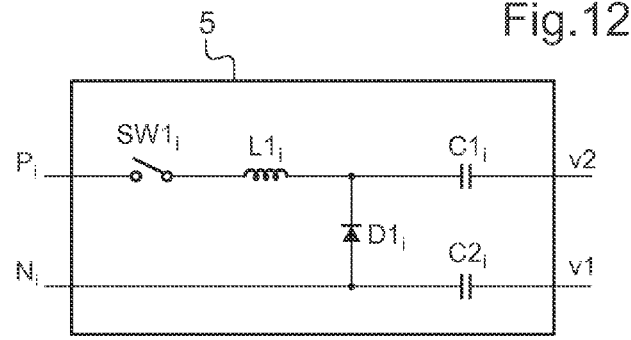
FIG. 12 is a block diagram of a second embodiment of a charging device of the equalization system.

As shown in FIG. 12, the charging device 5 of the second embodiment differs from the first embodiment shown in FIG. 5 in that it includes a second capacitor $C2_i$, the first end of which is connected to the pole v1 of the voltage generator 7 to which the first capacitor $C1_i$ is connected and the second end of which is connected to the pole $N_i$ of the stage $Et_i$.

This capacitor $C2_i$ provides a return path for some or all of the current supplied by the voltage generator 7.

Voltage Generator

This second embodiment is equally suitable for a voltage generator 7 supplying only a positive voltage pulse, for example.

Figure 13:
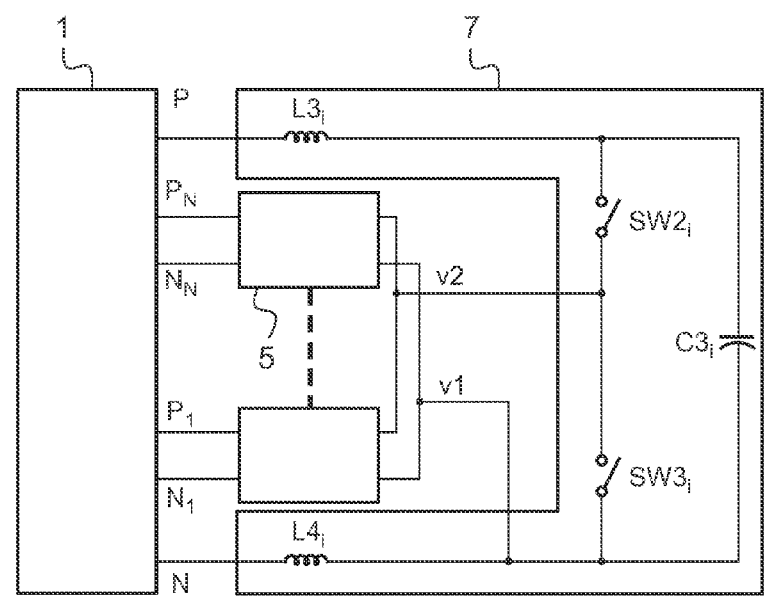
FIG. 13 is a block diagram of one exemplary embodiment of a voltage generator associated with the charging device from FIG. 12.
Figure 14:
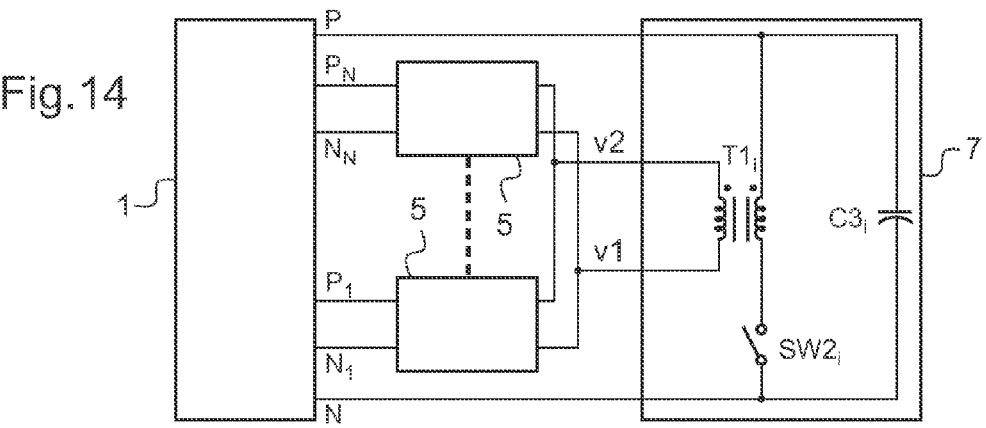
FIG. 14 is a block diagram of a variant embodiment of the voltage generator from FIG. 13.

For the charging device 5 of this second embodiment, two variant embodiments of a voltage generator 7 may be provided, as shown respectively in FIGS. 13 and 14.

First Variant (FIG. 13):

This voltage generator 7 differs from the voltage generator 7 of the first embodiment shown in FIG. 6 because two inductors $L3_i$ and $L4_i$ are implemented in series with the terminals N and P of the battery 1.

This therefore forces the current to flow through the second capacitors $C2_i$ of the charging devices 5 when the switch $SW3_i$ or $SW2_i$ of the voltage generator 7 is closed. The so-called decoupling capacitor $C3_i$ must be connected to the terminals of both switches.

Second Variant (FIG. 14);

The voltage generator 7 shown in FIG. 14 for its part includes a decoupling capacitor $C3_i$, a switch $SW2_i$ and a transformer $T1_i$. This voltage generator 7 has the advantage of minimizing the number of components compared to the voltage generator 7 of the first variant (FIG. 13).

Operation

Figure 15A:
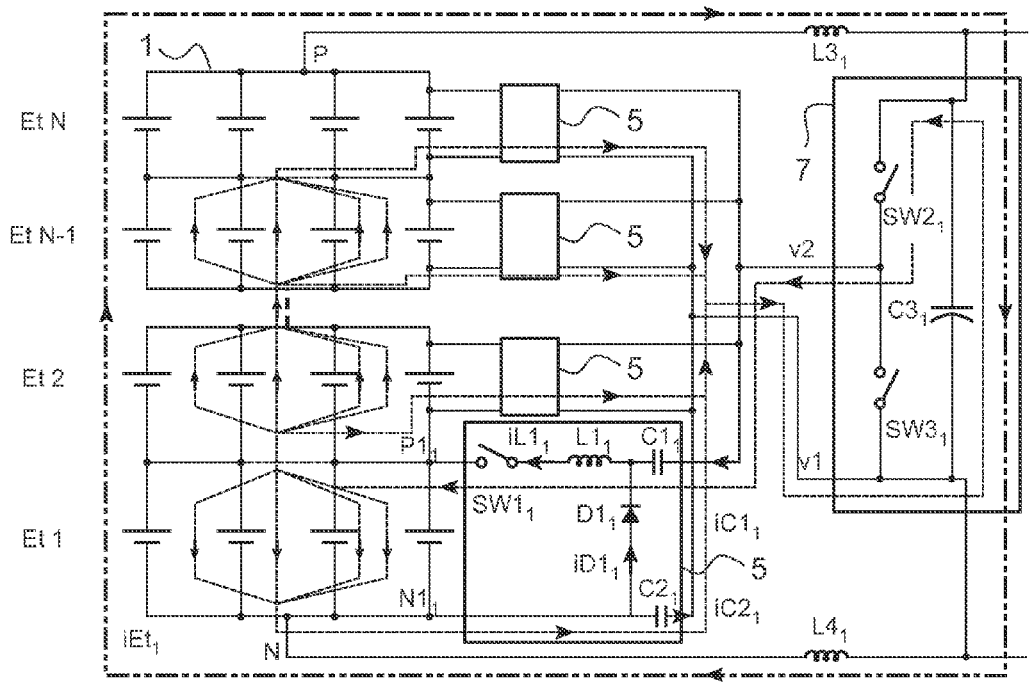
FIG. 15A is a block diagram of the equalization system including the charging device from FIG. 12 and the voltage generator from FIG. 13, in which there has been indicated the flow of current during the conduction period.
Figure 15B:
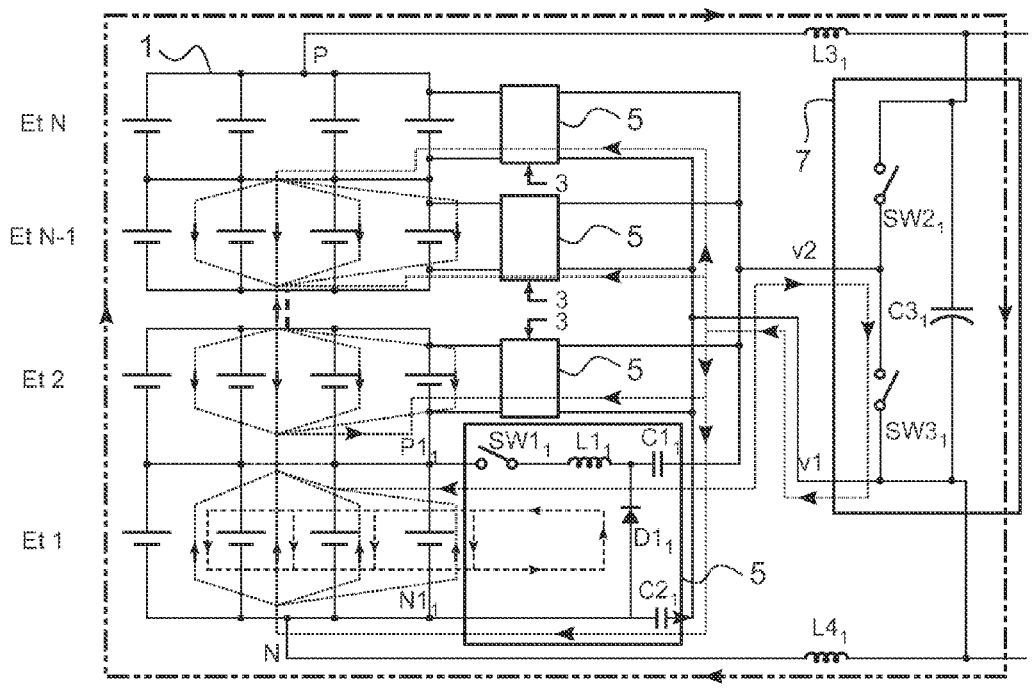
FIG. 15B is a block diagram of a circuit including the charging device from FIG. 12 and the voltage generator from FIG. 13, in which there has been indicated the flow of current at the end of the conduction period until the operating period.

The operation of the second embodiment associated with the voltage generator 7 shown in FIG. 13 is described below. It is shown in FIGS. 15A, 15B corresponding to the charging of the stage $Et_1$ and FIG. 16 corresponding more generally to charging a stage $Et_i$.

The current in the stage $Et_1$, $Et_i$ and the inductors $L3_1$, $L3_i$ and $L4_1$, $L4_i$ is represented diagrammatically by chain-dotted line arrows, by way of illustration, in that a current in the inductors is necessary for the mean current in the capacitor $C3_1$, $C3_i$ to be zero for a period of operation in the permanent regime. The current is considered direct and thus constant over a period T of operation. In FIG. 16, this current is ignored in the representation of the current $iEt_i(t)$ in the stage $Et_i$.

Operation is substantially identical to that of the first embodiment. What is additional to the first embodiment is that during the time t1 the current represented by dashed line arrows in FIG. 15A passes through all of the stages situated above and below the stage $Et_1$, $Et_i$ except for stage N. It flows through all the second capacitors $C2_j$ (with j=1 to N) of the charging devices 5. In the ideal case, the current is uniformly divided across all the capacitors. At the end of the time t1 and until the end of the period T of operation (FIG. 15B), current also flows through the stage $Et_1$, the set of second capacitors $C2_i$ of the charging devices 5 situated below and above the stage $Et_1$ under charge, the inductance $L1_1$, $L1_i$, the capacitor $C1_1$, $C1_i$, and the switch $SW3_1$, $SW3_i$ (represented in dotted line).

Compared to the first embodiment, this second embodiment has the advantage of educing the rms current in the non-charged stages.

During the time t1 and also from the moment at which the diode $D1_1$, $D1_i$ is blocked up to the end of the period T, the current in the capacitor $C1_1$, $C1_i$ is divided between the capacitors $C2_i$ of the charging devices 5. The closer the stage to the stage under charge, the higher the rms current to flow through this stage.

Moreover, the use of a supplementary switch (not shown) for each charging device connected for example in series between the terminal $N_1$, $N_i$ of the stage $Et_1$, $Et_i$ and the anode of the diode $D1_1$, $D1_i$ enables the rms current in the non-charged stages to be minimized. This switch prevents the capacitor $C2_i$ of the charging device(s) 5 that are not operating from conducting a portion of the current of one or more other charging devices 5 in operation. The rms current through the non-charged stages is in this case theoretically equal to the value of the direct current supplied by the battery.

Dimensioning

The dimensioning of the charging device 5 (FIG. 12) is based on the equations defining its operation as described above. The equations are effective for the associated voltage generator 7 (FIG. 13). For a simple dimensioning, the voltage at the terminals of the capacitor $C1_i$ and the capacitor $C2_i$, if present, is considered to be constant over a period T of operation of the charging device 5.

Equations 1, 2 and 3 for the current ($iL1_i$) in the inductor $L1_i$ are identical for the second embodiment and the first embodiment, and the same applies to equation 4 for defining the value ($t1_{(max)}$) not to be exceeded of the conduction period t1 and equation 5 for defining the mean output current.

The current, denoted $iEt_i(t)$, in a charged stage $Et_i$ depends on the number of charging devices operating, the position of the latter relative to the stage $Et_i$, and the position of the stage $Et_i$ relative to the numbers of stages. Considering the number M of charging devices 5 operating situated below the stage $Et_i$ (FIG. 16) and considering the number L of charging devices 5 operating above the stage $Et_i$, the current in the stage $Et_i$ during the time t1 may be approximated by equation 7. The current in the stage $Et_i$ from the moment at which the diode $D1_i$ is blocked to the end of the period T may be approximated by the same equation.

$$iEt_i(t) = iC1_i(t) \times \left[ \frac{i}{N} \times (1 + L + M) - M \right] \quad \text{(equation 7)}$$

Given that the mean current in the capacitor $C1_i$ is zero over a period of operation in the permanent regime, the mean current in the stage $Et_i$ during the time t1 and from the moment at which the diode $D1_i$ is blocked to the end of the period T is therefore zero. Taking into account the current in the inductors $L3_i$ and $L4_i$, the mean current ($IEt_{i(moy)}$) in the charged stage is defined by equation 6.

A decoupling capacitor $C3_i$ is used to implement the voltage generator 7 in this second embodiment. This capacitor $C3_i$ is defined to supply the necessary current to the charging devices 5 with a defined voltage drop at its terminals. The voltage drop at the terminals of the capacitor $C3_i$ as a function of the output current is given by equation 9, K being the number of charging devices 5 operating.

$$\Delta V = \frac{1}{2} \times K \times \frac{Ipic}{C1_i} \times t1 = \frac{1}{2} \times K \times \frac{Ve - Vs - Vd}{L1_i \times C1_i} \times t1^2 \quad \text{(equation 9)}$$

Simulations

The capacitors $C2_i$ have the same values as the capacitors $C1_i$, fixed at 2 µF.

The voltage generator simulated is that shown in FIG. 13.

The value of the two inductors $L3_i$ and $L4_i$ is fixed at 100 µH, which is a typical value in the field of power electronic converters.

A 10 µF decoupling capacitor $C3_i$ is used. This capacitor is defined to supply the necessary current to the charging devices 5 with a certain voltage drop at its terminals. The voltage drop at the terminals of the capacitor as a function of the output current is given by equation 9

The dimensioning of the charging device 5 of the second embodiment is identical to the dimensioning of the charging device of the first embodiment. For this reason, only one simulation result is described in this section in order to confirm that for identical values of the passive components $L1_i$ and $C1_i$ the mean output current of a charging device 5 of the first and second embodiments is identical.

The simulation result illustrates the extreme operating situation in which the device must operate in discontinuous conduction mode and the current in the inductor $L1_i$ must be zero or positive before each period of operation.

FIG. 17 shows the simulation result, showing the currents in the inductor $L1_7$ in the curve C9, the capacitor $C1_7$ in the curve C10, the diode $D1_7$ in the curve C11, and the accumulator that has the lowest charge voltage in the curve C12.

The mean output current $Is_{7(moy)}$ is equal to approximately 3.3 A. It is very close to the mean current value obtained in the first embodiment (approximately 3.4 A). The dimensioning of the first and second embodiments are thus similar.

The mean current in the inductors $L4_1$ and $L3_1$ is equal to approximately 330 mA. The mean current in the stages situated above and below the stage $Et_1$ under charge is equal to 330 mA. It is identical to the mean current of the non-charged stages of the first embodiment.

The rms current in the stage 8 is equal to 610 mA. The rms current in the stages situated above the stage $Et_i$ under charge decreases as the distance of the stage from the stage $Et_i$ increases. The rms current in the stage 10 is equal to the direct current that flows through the inductors $L3_1$ and $L4_1$, i.e. 330 mA. The rms current in the stage 6 is of the order of 915 mA. The ms current in the stages situated below the stage $Et_i$ under charge decreases as the distance of the stage away from the stage $Et_i$ increases. The rms current in the stage 1 is of the order of 360 mA. The rms current in the stages is reduced by a factor of at least 1.8 in the worst case scenario relative to the first embodiment.

Third Embodiment

A third embodiment of the equalization system 2 is described next.

Charging Device

FIG. 18 represents a third embodiment for a charging device 5. This third embodiment differs from the second embodiment in that:
- the second end of the second capacitor $C2_i$ is connected to the second end of the inductor $L1_i$ and to the pole $P_i$ of the stage,
- the cathode of the diode $D1_i$ is connected to the first end of the inductor $L1_i$, and
- the switch $SW1_i$ is connected to the second end of the capacitor $C1_i$ and to the first end of the inductor $L1_i$.

In a variant embodiment, a capacitor (not shown) may be added that is configured to filter the ripple on the current coming from the charging device 5 but instead of being connected between the terminal $N_i$ and the first end of the switch $SW1_i$, as in the first and second embodiments, in the third embodiment this capacitor is connected between the terminal $P_i$ and the anode of the diode $D1_i$.

In the third embodiment, the switch may also be connected to the output v2 of the voltage generator 7 and to the first end of the capacitor $C1_i$.

Voltage Generator

Just like the first and the second embodiments, the third embodiment is suitable for a voltage generator supplying only a positive voltage pulse.

For this third embodiment the voltage generator may be either of the voltage generators shown in the FIGS. 13 and 14 described for the second embodiment.

Figure 19A:
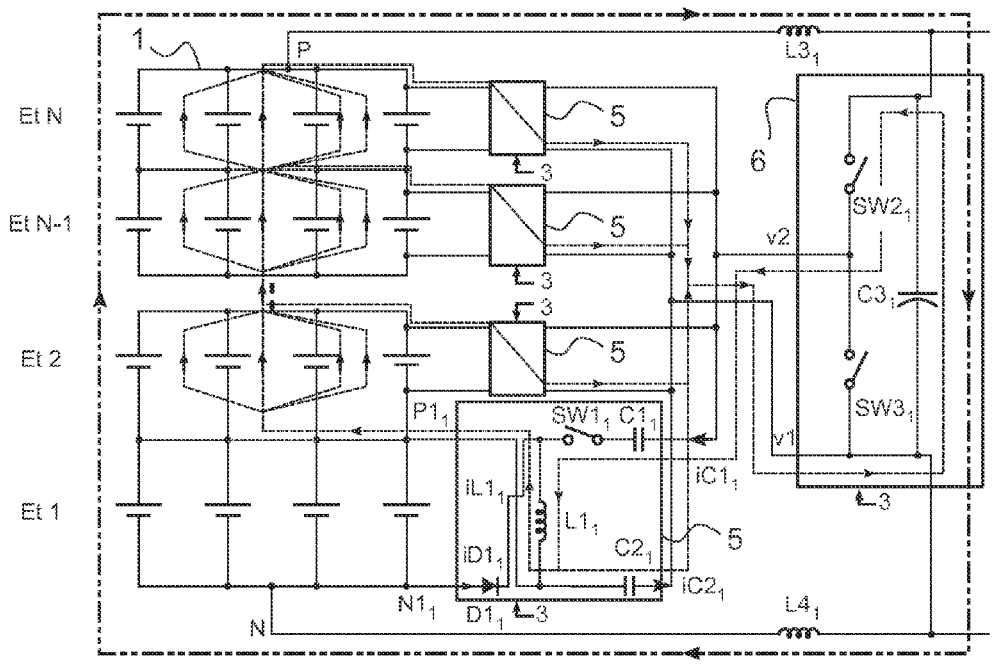
FIG. 19A is a block diagram of the equalization system including the charging device from FIG. 18 and the voltage generator from FIG. 13, in which there has been indicated the flow of the current during the conduction period.
Figure 19B:
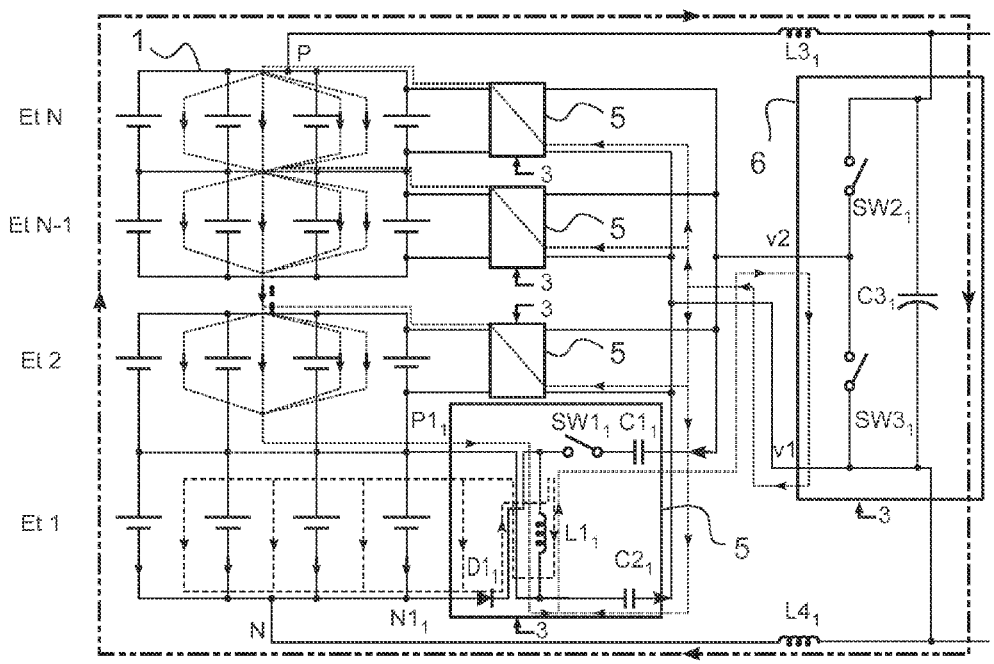
FIG. 19B is a block diagram of the equalization system including the charging device from FIG. 18 and the voltage generator from FIG. 13, in which there has been indicated the flow of the current at the end of the conduction period until the operating period.

Operation (FIGS. 16,19A,19B)

The operation of the third embodiment, associated with the voltage generator shown in FIG. 13, is described hereinafter. It is illustrated by FIGS. 19A,19B corresponding to the charging of the stage $Et_1$ and FIG. 16 corresponding more generally to charging a stage $Et_i$.

It is similar to the operation of the second embodiment with the single difference that, during the time t1, the current in the inductor $L1_i$ flows through all the stages situated above and below the stage $Et_i$ except for stage 1 and not stage N, as is the case for the second embodiment.

The evolution of the currents in the inductor $L1_i$, the two capacitors $C1_i$ and $C2_i$ and the diode $D1_i$ and the stage $Et_i$ in parallel is identical to that of the second embodiment (FIG. 16).

Where the special case of charging the stage $Et_i$ is concerned, the evolution of the current in this stage $Et_i$ varies from the general case because the current is cancelled out at t1 and also when the diodes are blocked.

Dimensioning

As above, parameterization of the charging device 5 (FIG. 18) is based on equations defining its operation and is effective for the associated voltage generator 7.

Equations 1 to 5 are identical to those for the first and second embodiments.

The current $IEt_i(t)$ in a charged stage depends on the number of charging devices operating, their positioning relative to the stage $Et_i$, and the position of the stage $Et_i$ relative to the numbers of stages. Considering the number M of charging devices operating situated below the stage $Et_i$ and considering the number L of charging devices in operation situated above the stage $Et_i$, the current in the stage $Et_i$ during the time t1 can be approximated by equation 10. The current in the stage $Et_i$ from the moment at which the diode $D1_i$ is blocked to the end of the period T may be approximated by the same equation.

$$iEt_i(t) = \frac{iC1_i(t)}{N} \times [(i-1) \times (L+1) - (N-i+1) \times M] \quad \text{(equation 10)}$$

Given that the mean current through the capacitor $C1_i$ is zero over a period of operation in the permanent regime, the mean current in the stage $Et_i$ during the time t1 and from the moment at which the diode $D1_i$ is blocked to the end of the period T is therefore zero. Considering the current in the inductors $L3_i$ and $L4_i$, the mean current ($IEt_{i(moy)}$) in the charged stage is defined by equation 6.

Simulations

The simulation conditions are identical to those for the second embodiment.

The dimensioning of the charging device 5 of the third embodiment is identical to the dimensioning of the charging device 5 of the first and second embodiments. For this reason, only one simulation result is illustrated in this section in order to confirm that for identical values of the passive components $L1_i$ and $C1_i$ the mean output current of a charging device of these three embodiments is identical.

The simulation result illustrates the extreme situation of operation for which the device must operate in discontinuous conduction mode and the current in the inductor $L1_i$ must be zero or positive before each period of operation T.

Figure 20:
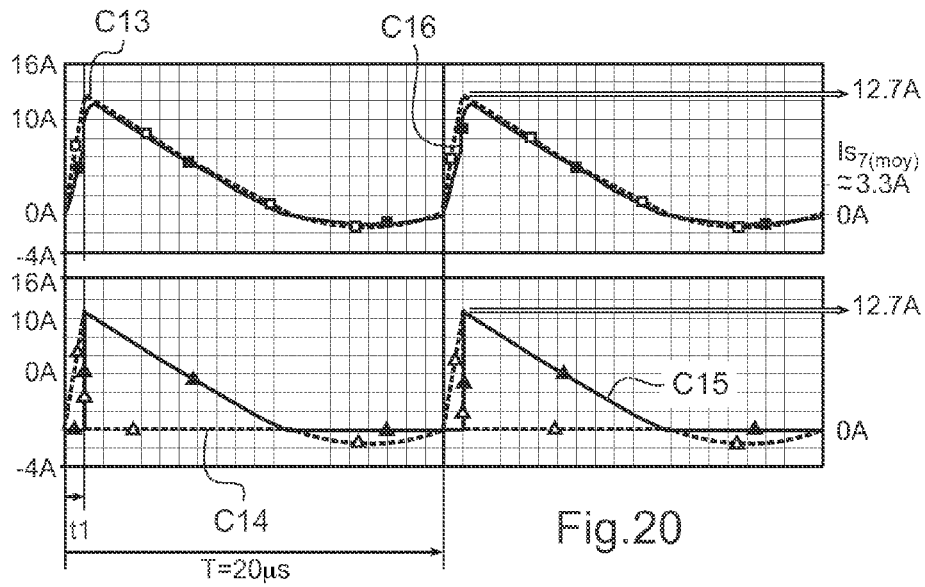
FIG. 20 shows diagrammatically curves of evolution of the various currents in the charging device from FIG. 18 and in the associated accumulator stage.

FIG. 20 shows the simulation result showing the current in the inductor $L1_7$ in the curve C13, the capacitor $C1_7$ in the curve C14, the diode $D1_7$ in the curve C15 and the accumulator that has the lowest charge voltage in the curve C16.

The mean output current $Is_{7(moy)}$ equal to approximately 3.3 A. It is very close to the mean current obtained for the first and second embodiments (approximately 3.4 A-3.3 A). The dimensioning of the first three embodiments is therefore similar.

The mean current in the inductors $L4_1$ and $L3_1$ is equal to approximately 330 mA. The mean current in the stages situated above and below the stage $Et_i$ under charge is equal to 330 mA. It is identical to the mean current of the non-charged stages of the first and second embodiments.

The rms current in the stage 8 is equal to 670 mA. The rms current in the stages situated above the stage $Et_i$ under charge decreases as the distance of the stage from the $Et_i$ increases. The rms current in the stage 10 is equal to 380 mA. The rms current in the stage 6 is of the order of 890 mA. The rms current in the stages situated below the stage $Et_i$ under charge decreases as the distance of the stage from the stage $Et_i$ increases. The rms current in the stage 1 is equal to the direct current in the inductors $L3_1$ and $L4_1$, i.e. 330 mA. The rms current in the non-charged stages is decreased by a factor of at least 1.9 in the worst case scenario relative to the first embodiment. The rms current in the non-charged stages is quasi-identical for the third and second embodiments.

Fourth Embodiment

A fourth embodiment of the equalization system 2 is described next.

Charging Device

Figure 21:
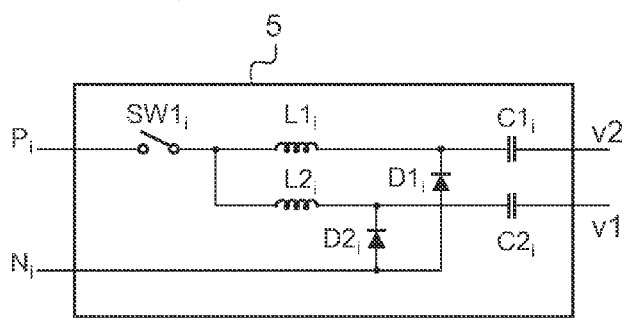
FIG. 21 is a block diagram of a fourth embodiment of a charging device of the equalization system.

FIG. 21 shows a fourth embodiment of the charging device 5. This fourth embodiment differs from the second embodiment in that the charging device 5 further includes a second inductor $L2_i$ and a second diode $D2_i$ and in that:

the second end of the second capacitor $C2_i$ is connected to the first end of the second inductor $L2_i$, the anode and the cathode of the second diode $D2_i$ are respectively connected to the pole $N_i$ of the stage and to the first end of the second inductor $L2_i$, the switch $SW1_i$ is connected to the second ends of the two inductors $L1_i$ and $L2_i$.

The fourth embodiment also differs in that it is adapted to be used with a voltage generator supplying positive and negative voltage pulses, for example.

Figure 22A:
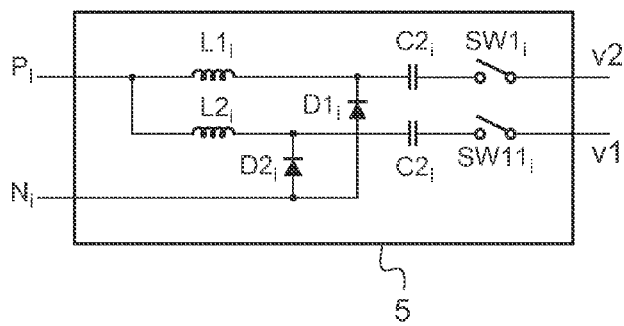
FIG. 22A is a block diagram of a first variant embodiment of the charging device from FIG. 21.
Figure 22B:
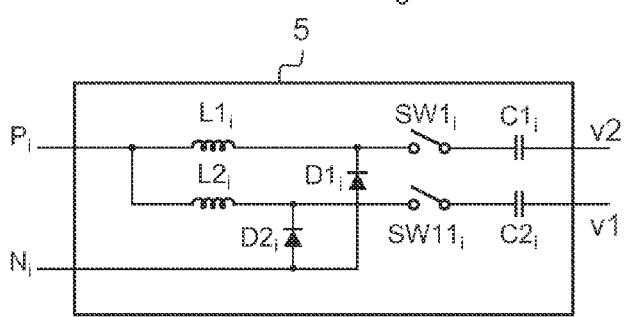
FIG. 22B is a block diagram of a second variant embodiment of the charging device from FIG. 21.

Variant positions of the switch $SW1_i$ for the fourth embodiment of the charging device are shown in FIGS. 22A and 22B.

In FIG. 22A, the switch $SW1_i$ is connected on its first end to the positive pole v2 of the voltage generator 7 and on its second end to the first end of the first capacitor $C1_i$.

In FIG. 22B, the first end of the switch $SW1_i$ is connected to the second end of the first capacitor $C1_i$ and its second end is connected to the first end of the first inductor $L1_i$.

Moreover, as seen in these figures, a supplementary switch $SW11_i$ must further be connected either to the output v1 of the voltage generator 7 and to the first end of the capacitor $C2_i$ (FIG. 22A) or to the second end of the capacitor $C2_i$ and to the cathode of the second diode $D2_i$ (FIG. 22B).

Voltage Generator

Figure 23:
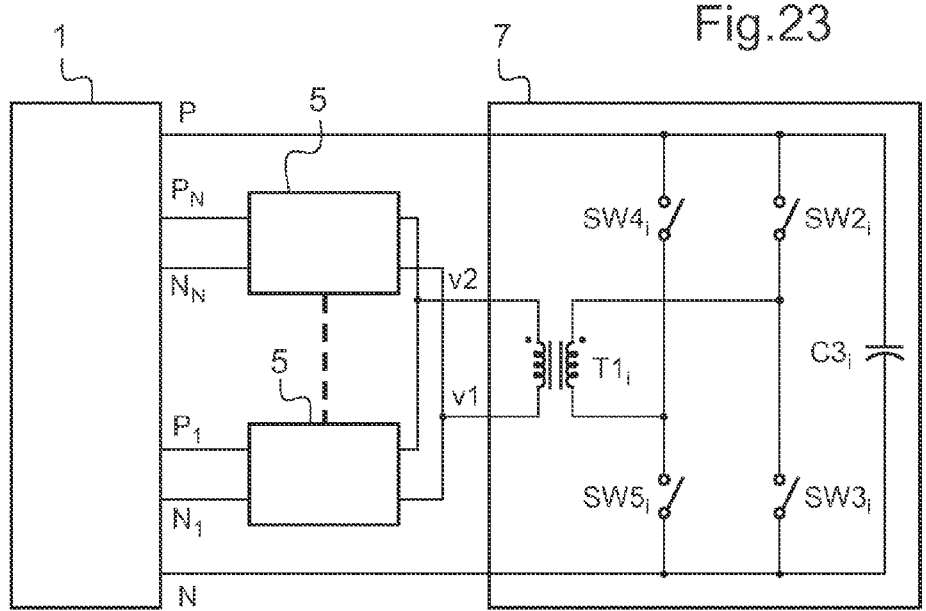
FIG. 23 is a block diagram of one embodiment of a voltage generator associated with the charging device from FIGS. 21, 22A and 22B, FIG. 23' is a block diagram of a variant embodiment of the voltage generator from FIG. 23.
Figure 23:
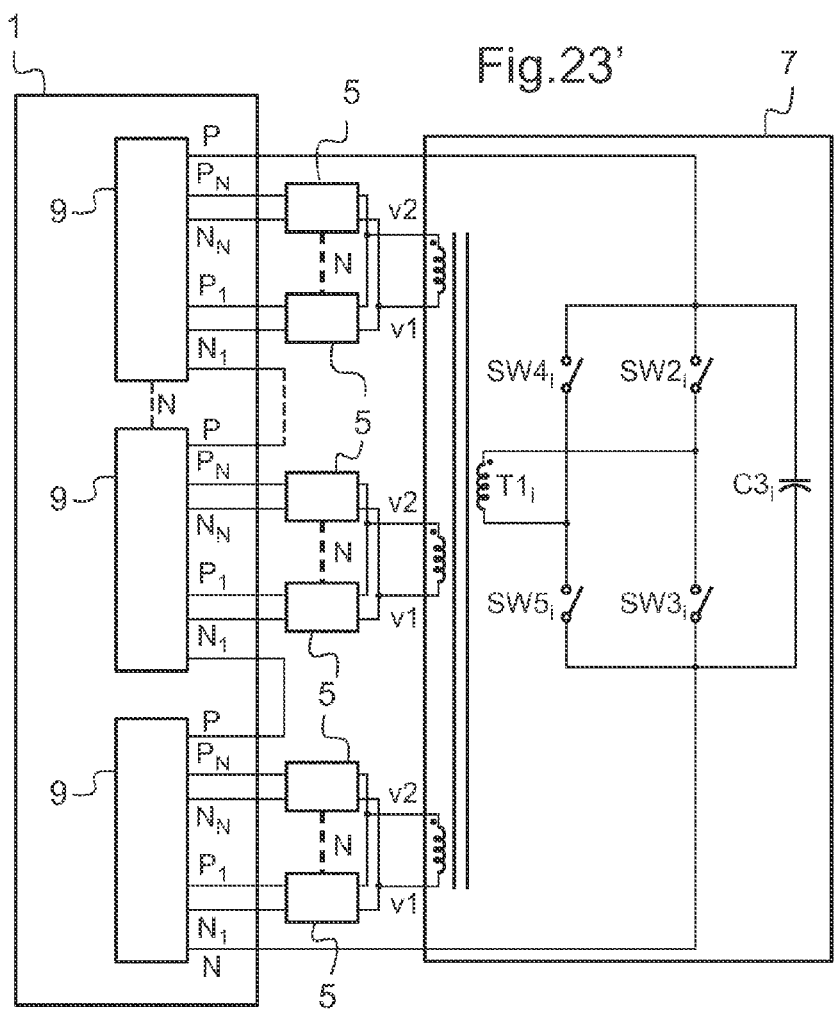

For a charging device 5 of this kind, a first exemplary embodiment of the voltage generator uses a complete bridge with four switches $SW2_i$ to $SW5_i$ and a transformer $T1_i$ (FIG. 23) with its variant shown in FIG. 23'. According to this variant, if a voltage generator 7 is connected to the terminals of the battery 1, the voltage generator 7 may use a transformer $T1_i$ constituted of a primary winding and a plurality of secondary windings. In this example there is shown at the terminals of the primary winding of the transformer $T1_i$ a complete bridge with four switches $SW2_i$ to $SW5_1$. The use of a plurality of secondary windings enables the withstand voltage of the capacitors of the charging devices 5 to be reduced. One secondary winding for the series connection of ten to twelve stages is one suggestion.

Figure 24A:
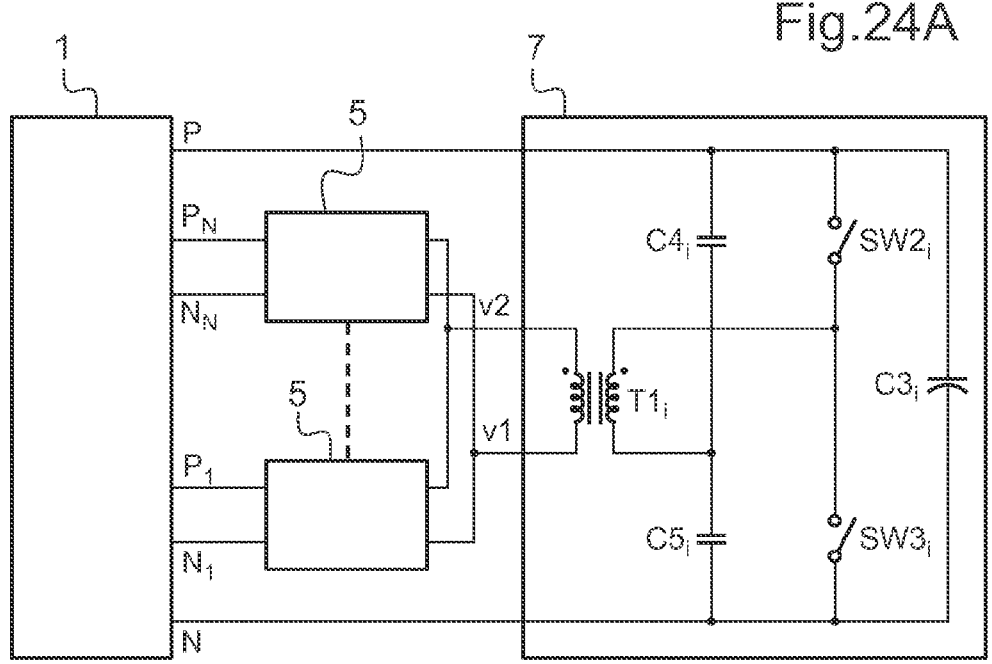
FIG. 24A is a block diagram of a variant embodiment of the voltage generator from FIG. 23.

A second exemplary embodiment of the voltage generator 7 consists in using a half-bridge with two switches $SW2_i$ and $SW3_i$ and a transformer $T1_i$ the primary of which is connected between the mid-points of the two switches $SW2_i$ and $SW3_i$ and two capacitors $C4_i$ and $C5_i$ (FIG. 24A). The second embodiment has the advantage of a smaller number of switches than the first embodiment and also of avoiding entirely the risk of saturation of the transformer because of an imbalance in the control sequence of the switches thanks to the capacitors $C4_i$ and $C5_i$ in series with the primary winding of the transformer $T1_i$.

Figure 24B:
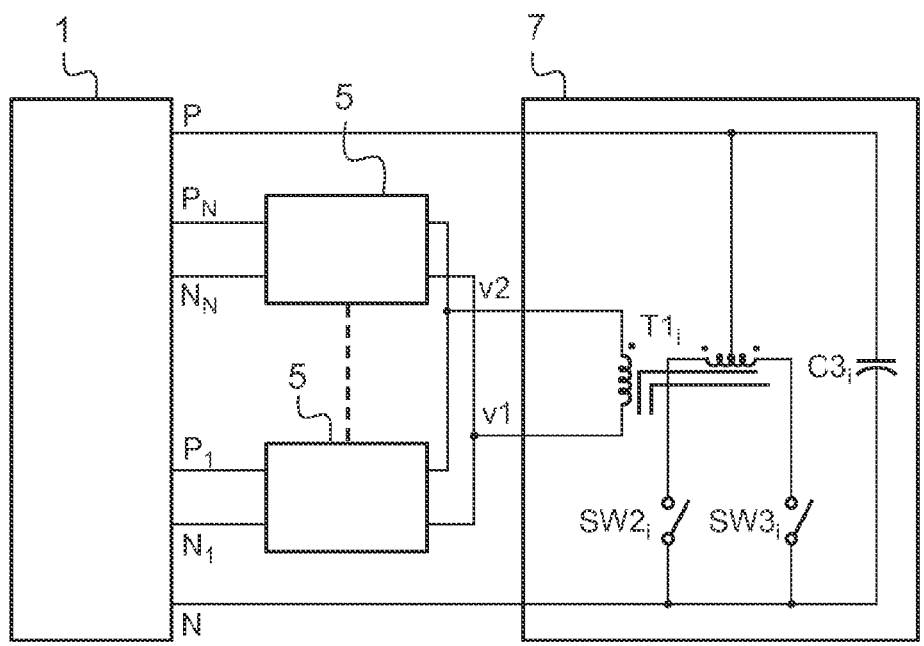
FIG. 24B is a block diagram another variant embodiment of the voltage generator from FIG. 23.

A third exemplary embodiment of the voltage generator uses a transformer $T1_i$ with a center-tapped primary and two switches $SW2_i$ and $SW3_i$ (FIG. 24B). The third exemplary embodiment has the advantage of a common reference for controlling the two switches $SW2_i$ and $SW3_i$.

Whichever voltage generator 7 is used, the conduction periods of the switches $SW2_i$ and $SW3_i$ is defined so that each charging device 5 operates in discontinuous conduction mode.

The three exemplary embodiments generate at the output positive and negative voltage pulses.

Figure 25A:
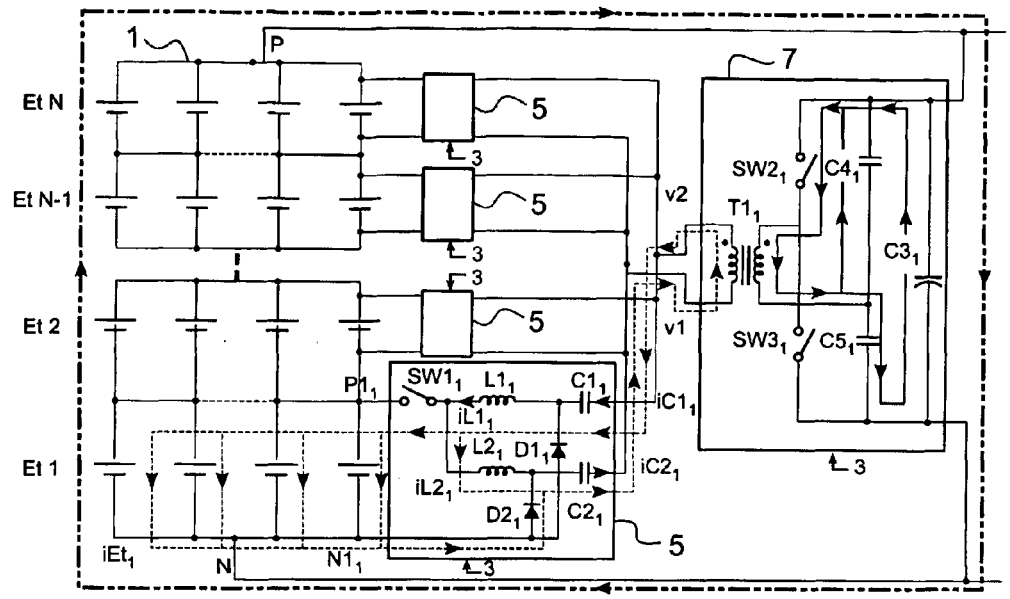
FIG. 25A is a block diagram of the equalization device including the charging device from FIG. 21 and the voltage generator from FIG. 24A, in which there has been indicated the flow of the current during the conduction period.
Figure 25B:
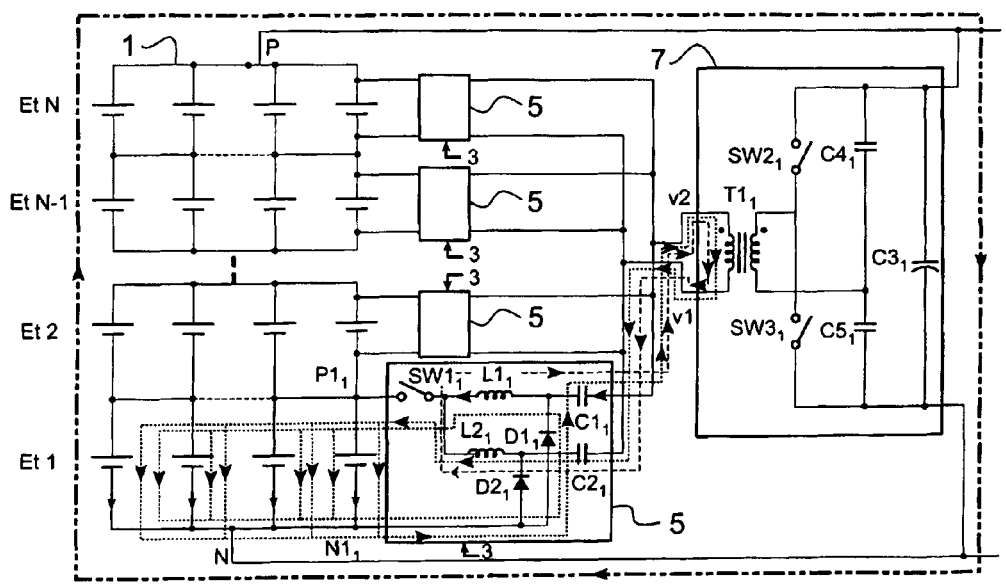
FIG. 25B is a block diagram of the equalization device including the charging device from FIG. 21 and the voltage generator from FIG. 24A, in which there has been indicated the flow of current at the end of the conduction period and up to half of the operating period.
Figure 26:
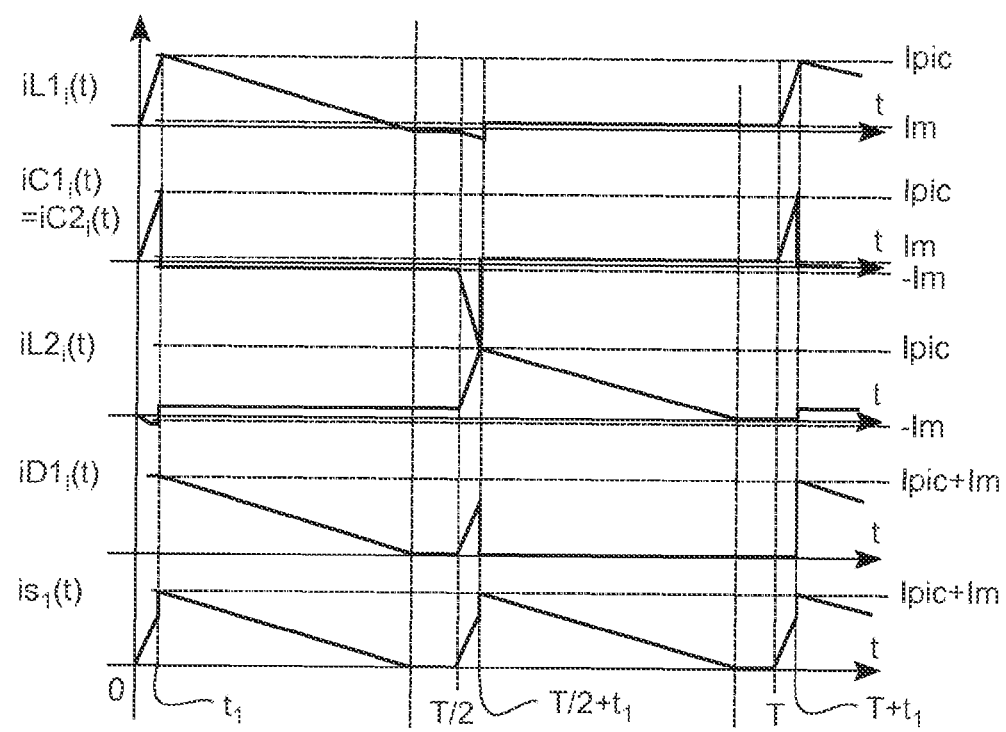
FIG. 26 is a diagram representing diagrammatically the evolution as function of time of the various currents in the charging device from FIG. 21.

Operation (FIGS. 25A, 25B and 26)

The operation of the fourth embodiment, associated with the voltage generator 7 shown in FIG. 24A, is described below.

In FIGS. 25A, 25B, operation is illustrated only for a positive voltage pulse.

The current in the battery is diagrammatically represented by chain-dotted line arrows by way of illustration, given that the current in the battery is necessary for the mean currents in the capacitors $C3_1$, $C4_1$ and $C5_1$ to be zero over a period of operation in the permanent regime. This current is considered direct and thus constant over a period of operation.

Operational differences compared to the second embodiment with the stage $Et_1$ under charge are described next.

During the time t1, the current in the inductor $L1_1$ increases proportionally to the voltage applied to its terminals, approximately equal to the voltage at the secondary of the transformer $T1_1$ less the voltage of the stage $Et_1$ under charge. The current flows only through the stage $Et_1$. The current in the capacitors $C1_1$ and $C2_1$ of the charging device 5 in operation is equal to the current in the inductor $L1_1$. During this phase, the second diode $D2_1$ of the charging device 5 is conducting. The diode $D1_1$ is blocked with at its terminals a voltage equal at least to the battery voltage. The second inductor $L2_1$ stores energy. The voltage at the terminals at the second inductor $L2_1$ is equal to minus the voltage of the stage $Et_1$ under charge less the voltage drop with the diode $D2_1$ in the on state.

At the end of the time t1, the switch $SW2_1$ opens. The current in the inductor $L1_1$ reaches a peak value at this time, approximately equal to the voltage applied to the terminals of the inductor when the voltage generator is supplying energy, multiplied by t1 and divided by the value of the inductance.

At the end of the time t1 and up to halfway through the period of operation T/2, the voltage generator does not impose a voltage on the terminals v2 and v1 of the charging device of the stage $Et_1$. The switches $SW3_1$ and $SW2_1$ are open (FIGS. 25B and 26). The current in the inductor $L1_1$ decreases proportionally to the voltage applied to its terminals, equal at least to the voltage of the accumulator stage $Et_1$ less the voltage drop with the diode $D1_1$ in the on state. The diode $D1_1$ is on until the current in the stage $Et_1$ under charge cancels out. The diode $D1_1$ conducts the current in the inductor $L1_1$ and also the current in the inductor $L2_1$. The current in the inductor $L2_1$ is considered constant during this phase in that the impedance of the secondary of the transformer is considered to be much greater than the impedance of the inductors $L1_1$ and $L2_1$. The current in the inductor $L2_1$ is equal to the magnetization current of the transformer. It is denoted lm in FIG. 25. When the diode $D1_1$ is blocked, the current in the inductor $L2_1$ no longer flows through the stage but is equal and opposite the current in the inductor $L1_1$. During this phase, the diode $D2_1$ is blocked with at its terminals a voltage equal at least to the voltage of the stage $Et_1$.

At the end of the half-period T/2 and until the end of the time T/2 plus the time t1, a negative voltage is applied between the terminals v2 and v1 of the voltage generator. The switch $SW3_1$ is closed and the switch $SW2_1$ is open. Energy is stored in the inductor $L2_1$. The current in the inductor $L2_1$ increases proportionally to the voltage applied to its terminals, approximately equal to the secondary voltage of the transformer $T1_1$ less the voltage of the stage under charge. The current flows only through the stage $Et_1$ under charge. The current in the capacitors $C1_1$ and $C2_1$ of the charging device in operation is equal to the current in the inductor $L2_1$. During this phase, the diode $D1_1$ conducts. The diode $D2_1$ is blocked with at its terminals a voltage equal at least to the voltage of the battery. The inductor $L1_1$ stores energy. The voltage at the terminals of the inductor $L1_1$ is equal at least to the voltage of the stage $Et_1$ under charge less the voltage drop with the diode $D1_1$ in the on state.

At the end of the time T/2 plus t1 the switch $SW3_1$ opens. The current in the inductor reaches a peak value at this time, approximately equal to the voltage applied to the terminals of the inductor when the voltage generator is supplying energy, multiplied by t1 and divided by the value of the inductance.

At the end of the time T/2 plus t1 and up to the end of the period T, the voltage generator 7 does not impose a voltage on the terminals v2 and v1 of the charging device 5 of the stage $Et_1$. The switches $SW3_1$ and $SW2_1$ are open. The current in the inductor $L2_1$ decreases proportionately to the voltage applied to its terminals, equal to at least the voltage of the accumulator stage $Et_1$ less the voltage drop with the diode $D2_1$ in the on state. The diode $D2_1$ is on until the current in the stage $Et_1$ under charge cancels out. The diode $D2_1$ conducts the current in the inductor $L2_1$ and also the current in the inductor $L1_1$. The current in the inductor $L1_1$ is equal to the magnetization current (lm) of the transformer. When the diode $D2_1$ is blocked the current in the inductor $L1_1$ no longer flows through the stage but is equal and opposite the current in the inductor $L2_1$. During this phase, the diode $D1_1$ is blocked with at its terminals a voltage equal at least to the voltage of the stage $Et_1$.

This fourth embodiment has the advantage of imposing a minimum rms current on the stages that are not charged thanks to the fact that the instantaneous current in the capacitors $C1_1$ and $C2_1$ is identical. The rms current is thus equal to the current supplied by the battery 1 considering this current is a direct current.

Dimensioning

As before, the dimensioning of the charging device 5 (FIG. 21) is based on the equations defining its operation and is effective for the associated voltage generator 7.

During the time t1 the current ($iL1_i$) in the inductor $L1_i$ increases. The current is considered zero in each operating period. The voltage at the secondary of the transformer is denoted $VsT1_i$. The instantaneous sum of the voltage at the terminals of the capacitors $C1_i$ and $C2_i$ is considered zero. Ignoring the voltage drop with the switches $SW2_i$ and $SW1_i$ in the on state and considering the voltage drop Vd with the diode in the on state, the current $iL1_i(t)$ is written:

$$iL1_i(t) = \frac{VsT1_i - Vs - Vd}{L1_i} \times t \quad \text{(equation 11)}$$

At the end of the time t1, the itch $SW2_i$ opens. The current in the inductor $L1_i$ reaches the peak value of:

$$iL1_i(t1) = Ipic = \frac{VsT1_i - Vs - Vd}{L1_i} \times t1 \quad \text{(equation 12)}$$

At the end of the time t1 and until cancellation of the current in the inductor $L1_i$, the diode $D1_i$ conducts. The current in the inductor $L1_i$ decreases in accordance with the following law.

$$iL1_i(t) = -\frac{Vs + Vd}{L1_i} \times t + Ipic \quad \text{(equation 13)}$$

The current in the inductor $L2_i$ is governed between T/2 and T by the same equations as the current in the inductor $L1_i$ between the time 0 and half the period of operation T/2.

From equation 13, the value ($t1_{(max)}$) not to be exceeded of the conduction period t1 for the device to operate in discontinuous conduction mode can be defined. The current in the inductors $L1_i$ and $L2_i$ cancels out before each half-period of operation of the device. To limit the ripple on the output current, it is possible to cancel out the current in the inductors in the vicinity of each period of operation. In the present situation, see FIG. 26, the time $t1_{(max)}$, is determined considering the current in the inductors $L1_i$ and $L2_i$ to be cancelled at T/2. To consider the worst case scenario, the time $t1_{(max)}$ is to be evaluated for the maximum input voltage $VsT1_i$ and the minimum output voltage Vs. Moreover, the voltage drops of the diodes may be ignored in order to consider the worst case scenario.

$$t1_{(max)} = \frac{T}{2} \times \frac{1}{\frac{VsT1_i - Vs - Vd}{Vs + Vd} + 1} \qquad \text{(equation 14)}$$

The output current $is_i(t)$ of the charging device is equal to the sum of the currents in the inductors $L1_i$ and $L2_i$. The mean output current ($Is_{i(moy)}$) is calculated from equation 15 ignoring lm and the currents $iL_1$ and $iL_2$ during the periods when the diodes $D1_i$ and $D2_i$, respectively, conduct. It is further assumed that the inductors $L1_i$ and $L2_i$ are identical.

$$Is_{i(moy)} = \frac{Ipic}{T} \times \left[t_1 + \frac{Ipic \times L1_i}{(Vs + Vd)}\right] = \qquad \text{(equation 15)}$$
$$\frac{t1^2}{T \times L1_i} \times \frac{VsT1_i \times (VsT1_i - Vs - Vd)}{Vs + Vd}$$

The current, denoted $iEt_i(t)$, in a charged stage i depends only on the number of charging devices operating for this embodiment. Considering the number K of charging devices operating and the transformation ratio m of the transformer $T1_i$ (m=v2/v1), the mean value ($IEt_{i(moy)}$) of the current in the charged stage is obtained from equation 16. The currents in the inductors $L1_i$ and $L2_i$ when the diodes $D1_i$ and $D2_i$, respectively, conduct is not considered $$IEt_{i(moy)} = \frac{1}{T} \times Ipic \times \left[t_1 \times \left(1 - \frac{K \times m}{2}\right) + \frac{Ipic \times L1_i}{(Vs + Vd)}\right] \qquad \text{(equation 16)}$$

EXAMPLE

For the fourth embodiment of the charging device 5 associated with the voltage generator 7 from FIG. 21, the transformation ratio m of the transformer $T1_i$ is fixed at 2 in order to maintain at the secondary of the transformer $T1_i$ a voltage equal to the battery voltage.

The hypotheses are the same as those of the first embodiment but the frequency is 25 kHz.

The time $t1_{(max)}$ is calculated using the minimum voltage drop of the diodes and the maximum input voltage and the minimum output voltage of the charging device. The maximum values of the inductors $L1_{i(max)}$ and $L2_{i(max)}$ are for their part calculated using the maximum voltage drop of the diodes and the minimum input voltage and the maximum output voltage of the charging device. The time $t1_{(max)}$ is used to calculate the value of the inductor $L1_i$ in order to minimize the peak current and the rms current in the inductor, the switches and the diodes. For robustness, lower values may be used.

$$t1_{(max)} = \frac{T}{2} \times \frac{1}{\frac{VsT1_i - Vs - Vd}{Vs + Vd} + 1} \qquad \text{(equation 14)}$$
$$= \frac{1}{2 \times 25 \times 10^3} \times \frac{1}{\frac{3.6 \times 9 - 0.3}{2.5 + 0.3} + 1}$$

$$t1_{(max)} = 1.60 \ \mu s$$

$$L1_{i(max)} = L2_{i(max)} = \frac{t1^2}{T \times Is_{i(moy)}} \times \qquad \text{(equation 15)}$$
$$\frac{VsT1_i \times (VsT1_i - Vs - Vd)}{Vs + Vd}$$
$$= 25 \times 10^3 \times (1.60 \times 10^{-6})^2 \times$$
$$\frac{(2.5 \times 9 + 3.6) \times (2.5 \times 9 - 0.7)}{3.6 + 0.7}$$

$$L1_{i(max)} = L2_{i(max)} = 8.5 \ \mu H$$

Simulations

The value of the inductors $L1_i$ and $L2_i$ is fixed at 8.5 µH. The value of the blocking capacitors $C1_i$ and $C2_i$ is fixed at 2 µF.

In this fourth embodiment, a typical operating frequency (F) of 25 kHz is assumed, i.e. T=1/F=40 µs.

The voltage generator 7 simulated is that shown in FIG. 24A. It supplies a positive voltage pulse when the switch $SW2_i$ is closed and the switch $SW3_i$ is open. It supplies a negative voltage pulse as long as the switch $SW3_i$ is closed and the switch $SW2_i$ is open.

When the switches $SW2_i$ and $SW3_i$ are in the open state, the voltage at the terminals of the primary of the transformer $T1_i$ is not fixed. The conduction period of the switches $SW2_i$ and $SW3_i$ is fixed at 1.6 µs. A diode is implemented in parallel with each switch in order to enable demagnetization of the transformer primary also. The capacitors $C3_i$, $C4_i$ and $C5_i$ are fixed at 10 µF in this example. As for the third embodiment, these capacitors are defined to supply the necessary current to the primary of the transformer $T1_i$ with a certain voltage drop at its terminals. The voltage drop at the terminals of the capacitor is given as a function of the output current by equation 9.

An inductor L5 connected in series with the battery and the input of the voltage generator is used to filter the ripple on the current from the battery.

First Simulation (FIG. 27):

The first result illustrates the extreme case of operation for which the mean output current must be at least 1 A.

Figure 27:
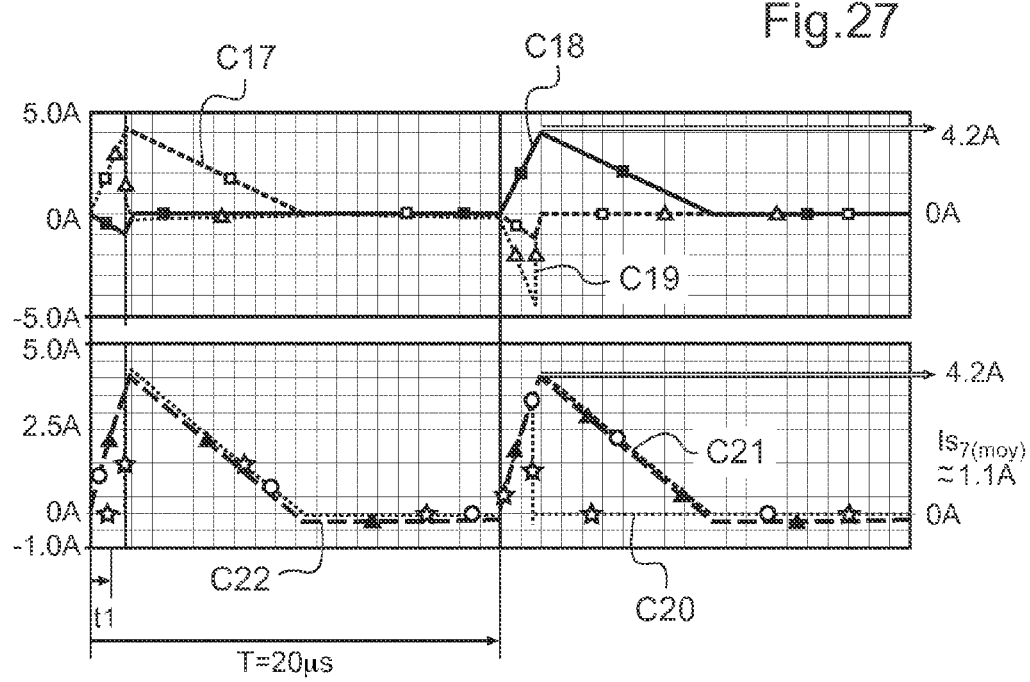
FIG. 27 shows diagrammatically curves of evolution of the various currents in the charging device from FIG. 21 and in the associated accumulator stage for a first simulation.

FIG. 27 shows the simulation result showing the currents in the inductors $L1_7$ and $L2_7$ in the curves C17 and C18, respectively, the capacitor $C1_7$ in the curve C19, the diode $D1_7$ in the curve C20, the output of the charging device in the curve C21 and the accumulator having the highest charge voltage in the curve C22.

The operation observed is similar to the operation described in the previous section concerning the fourth embodiment.

The mean output current $Is_{7(moy)}$ is equal to approximately 1.1 A. A minimum mean current of 1 A is complied with whatever the voltage of the charged accumulator and the voltage of the accumulator battery.

The circuit operates in discontinuous conduction mode with the current in the inductors $L1_i$ and $L2_i$ cancelled out before each half-period of operation of the device, as is required.

Second Simulation (FIG. 28):

The second result illustrates the extreme case of operation for which the device must operate in discontinuous conduction mode, i.e. the current flowing in the inductors $L1_i$ and $L2_i$ must cancel out before each half-period of operation $T/2$ of the device.

Figure 28:
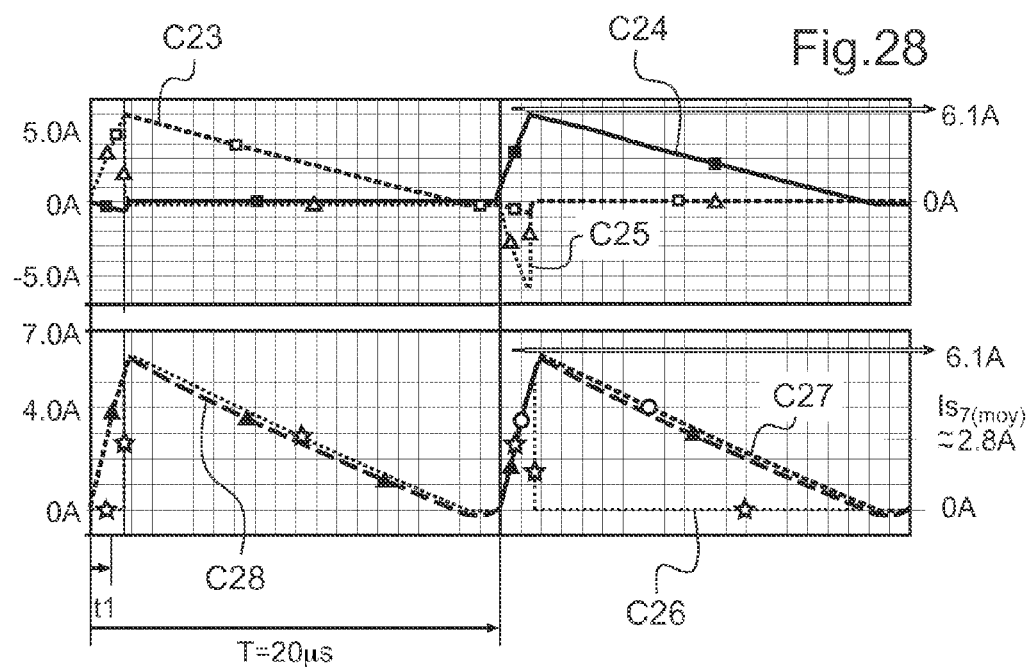
FIG. 28 shows diagrammatically curves of evolution of the various currents in the charging device from FIG. 21 and in the associated accumulator stage for a second simulation.

FIG. 28 shows the simulation result showing the currents in the inductors $L1_7$ and $L2_7$ in the curves C23 and C24, respectively, the capacitor $C1_7$ in the curve C25, the diode $D1_7$ in the curve C26, the output of the charging device in the curve C27 and the accumulator having the lowest charge voltage in the curve C28.

The circuit operates in discontinuous conduction mode and the current flowing in the inductors $L1_i$ and $L2_i$ is cancelled out as required before each half-period of operation of the device. Operation in discontinuous conduction mode is complied with whatever the voltage of the charged accumulator and the voltage of the accumulator battery.

The mean output current $Is_{7(moy)}$ is equal to approximately 2.8 A. It is greater than the minimum value of 1 A. The direct current in the battery is equal to approximately 260 mA. The rms current in the non-charged stages is equal to the direct current supplied by the battery.

Accordingly, whichever embodiment is used, effective equalization of the charging of the accumulator battery 1 is obtained.

The invention claimed is:

1. An apparatus comprising a battery equalization system, said battery equalization system comprising two stages of accumulators placed in series, each stage having a negative pole and a positive pole, each stage comprising an accumulator placed between said negative pole and said positive pole, a voltage generator comprising a positive terminal and a negative terminal, for each stage of accumulators, an associated charging device powered by said voltage generator, said associated charging device comprising an inductor, a first capacitor having a first end and a second end, said first end being connected to a terminal of said voltage generator, a diode having an anode and a cathode, said diode being connected by said anode to said negative pole of said associated stage of accumulators and connected to an end of said inductor to allow, when said diode is forward biased, a flow of a charging current through said associated stage of accumulators, said associated diode and said associated inductor, and a switch, one end of which is linked to an end of said inductor so that said switch, said inductor and said first capacitor of said associated charging device are connected in series between a terminal of said voltage generator and a pole of said associated stage of accumulators, and a control device configured to, during a conduction time interval, to apply a voltage variation between said terminals of said voltage generator and to close a switch of a charging device associated with a stage of accumulators to be charged such that said inductor and said switch of said charging device are traversed by an increasing power supply current originating from said voltage generator and such that said inductor stores energy, and after said conduction time interval, to interrupt said power supply current through said inductor and allow transfer of the energy stored in said inductor to said associated stage of accumulators by flow of a decreasing charging current through said associated inductor and said associated diode.

2. The apparatus of claim 1, wherein said voltage generator is connected to a predefined number of charging devices.

3. The apparatus of claim 1, wherein said first capacitor comprises a first end connected to said positive terminal of said voltage generator.

4. The apparatus of claim 3, wherein a second end of said first capacitor is connected to a first end of said inductor, a cathode of said diode is connected to the second end of the first capacitor, and the switch of the charging device is connected by a first end to a second end of the inductor and by a second end to the positive pole of the associated stage of accumulators.

5. The apparatus of claim 3, wherein said charging device includes a first capacitor, a first side of which is connected to said positive terminal of said voltage generator and a second side of which is connected to a first end of said inductor, a second capacitor, a first side of which is connected to said negative terminal of said voltage generator and a second side of which is connected to said negative pole of said associated stage of accumulators or to a second end of said inductor and to said positive pole of said associated stage of accumulators, and wherein said diode is connected, by said anode thereof, to said negative pole of said associated stage of accumulators, and wherein said diode is connected, by said cathode thereof, to said first end of said inductor, and wherein said switch of said charging device is connected by one end to said inductor and by another end to said positive pole of said associated stage of accumulators or to said first capacitor.

6. The apparatus of claim 1, wherein said diode is connected by said anode to said negative pole of said associated stage of accumulators, and wherein said diode is connected by a cathode thereof to a first end of said inductor.

7. The apparatus of claim 1, wherein said control device is further configured to interrupt said power supply current through said inductor by imposing a zero voltage across said terminals of said voltage generator.

8. The apparatus of claim 1, wherein said control device is configured to control a rate of closing of said switch of a charging device associated with a stage of accumulators to be charged in response to application, beforehand, of a voltage to said poles of said voltage generator feeding said charging device.

9. The apparatus of claim 1, wherein said voltage generator comprises at least one switch controlled by said control device, and wherein said voltage generator comprises a decoupling capacitor.

10. The apparatus of claim 9, wherein said voltage generator comprises a configuration selected from the group consisting of a first configuration and a second configuration, wherein said first configuration comprises two controlled switches and two inductors, and wherein said second configuration comprises a switch and a transformer.

11. The apparatus of claim 9, wherein said control device is configured to close and to open said controlled switch of said voltage generator device with a conduction time interval and an opening time interval that are constant during a charging phase.

12. The apparatus of claim 11, wherein said conduction time interval is calculated such that said charging device operates in discontinuous conduction mode independently of voltage levels of said associated stage of accumulators and of a battery during said charging phase.

13. The apparatus of claim 1, further comprising a battery including an elementary module, said elementary module comprising terminals and a plurality of stages of accumulators in series, and a supplementary charging device at said terminals.

14. The apparatus of claim 13, wherein said battery comprises a plurality of elementary modules disposed in series, and wherein said equalization system includes a supplementary charging device at terminals of a predetermined number of said elementary modules.

15. The apparatus of claim 1, further comprising a charging device for a battery stage of accumulators, wherein said equalization system is operably coupled to said charging device.

* * * * *